United States Patent
Yang et al.

(10) Patent No.: US 6,676,307 B1
(45) Date of Patent: Jan. 13, 2004

(54) METHOD AND SYSTEM FOR CONTROLLING SPLICE ATTENUATION

(75) Inventors: Yaguang Yang, Rockville, MD (US); Waqar Mahmood, Columbia, MD (US); Erin Sahinci, Laurel, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/002,345

(22) Filed: Oct. 25, 2001

Related U.S. Application Data

(63) Continuation-in-part of application No. 09/651,368, filed on Aug. 30, 2000, now Pat. No. 6,464,410, which is a continuation-in-part of application No. 09/593,354, filed on Jun. 14, 2000, now Pat. No. 6,478,482.

(51) Int. Cl.[7] .............................................. G02B 6/255
(52) U.S. Cl. .............................. 385/96; 385/95; 385/97; 385/98; 65/410
(58) Field of Search .............................. 385/96, 97, 98, 385/95; 219/121.37, 121.38, 121.45, 121.46, 121.58; 65/410

(56) References Cited

U.S. PATENT DOCUMENTS

| 4,474,423 A | * 10/1984 | Bisbee ........................ 385/52 |
| 4,561,719 A | * 12/1985 | Quan .......................... 385/98 |
| 5,285,516 A | * 2/1994 | Wong ......................... 385/140 |
| 5,570,446 A | * 10/1996 | Zheng ......................... 385/98 |
| 2003/0108307 A1 | * 6/2003 | Eskildsen .................... 385/96 |

FOREIGN PATENT DOCUMENTS

EP        0690318        * 1/1996

* cited by examiner

Primary Examiner—Drew A. Dunn
Assistant Examiner—Leo Boutsikaris
(74) Attorney, Agent, or Firm—Michael R. Cammarata

(57) ABSTRACT

A method of controlling an optical fiber splicing machine utilizes a power control mode to control the amount of power delivered to fuse the fibers. In the power control mode, the attenuation is measured while the fusing process is occurring. A rate of attenuation loss is predicted from the measured attenuation values by using an estimator. If the rate of attenuation loss indicates that a threshold insertion loss will be crossed before the next attenuation measurement, the splicing machine is stopped prior to the next attenuation measurement. If the desired attenuation is not achieved, an energy control mode is utilized which controls the amount of energy delivered to fuse the fibers. After delivering this energy, the method measures the attenuation. If not within desired values, the energy mode is repeated. At each iteration the splicing control function utilized by the energy control mode may be reprogrammed. A PID control formula may be used to determine the arc current for each iteration. A system for performing the attenuating splice uses, in addition to an optical fiber splicing machine, a laser and power meter to measure insertion loss as well as a controller to implement the splicing methods.

24 Claims, 18 Drawing Sheets

METHOD AND SYSTEM FOR CONTROLLING SPLICE ATTENUATION

CROSS REFERENCE TO RELATED APPLICATION

This application is a continuation-in-part of U.S. patent application Ser. No. 09/651,368 filed Aug. 30, 2000, now U.S. Pat. No. 6,469,410 which is a continuation-in-part of U.S. patent application Ser. No. 09/593,354 filed Jun. 14, 2000 now U.S. Pat. No. 6,478,482, the entire contents of which are incorporated herein by reference.

BACKGROUND OF THE INVENTION

1. Field of Invention

This invention generally relates to fiber optics and, more particularly, to fiber splices, fiber splicing machines and methods therefore.

2. Description of Related Art

Conventional splicing operations and equipment are designed to minimize or eliminate optical signal attenuation. To that end, conventional splicing machines are designed to bring the two fibers into as perfect an alignment as possible. This goal of achieving optimum alignment between the fibers is met by utilizing various detectors and fine alignment control functions so that the fibers are aligned. Typically, the respective optical axes are aligned first and then the fibers are brought together so that their ends are in direct contact.

Conventional splicing machines utilize an electric arc to fuse the fibers. Such machines permit an operator to set fusing current, fusing time and fine tune fiber alignment to achieve the best alignment possible between the fibers. Such conventional splicing machines are designed to minimize the insertion loss or attenuation of the resulting splice by, for example, accurately aligning the fibers. These conventional splicing machines may be programmed according to various recipes that specify optimum fusing currents and fusing times for a variety of fiber types, core diameters and other fiber properties.

Such conventional splicing machines also permit an operator to intentionally misalign the fibers in a crude effort to perform an attenuating splice. Using various recipes similar to those mentioned above, an operator can construct an attenuating splice. This conventional attenuating splice operation requires a high degree of operator experience to choose the proper parameters such as fusion time and current. Furthermore, these operations are labor intensive and include typing in the large number of parameters at each step. The success rate also varies with the skill of the operator, machine condition, and environmental conditions. Even with an experienced operator and ideal conditions, these conventional techniques cannot provide an accurate attenuation value.

Various other conventional techniques exist for constructing attenuating splices. Gleason et al. (U.S. Pat. No. 4,557,557), for example, heats aligned optical fiber ends until they are in a plastic state. Then, the fiber ends are physically distorted by axial movement of one of the fiber ends. The amount of movement is controlled according to a measured optical loss across the splice. The fusion splice formed by this technique imposes a lumped optical loss value between the fiber ends. Yamamoto, et al. (U.S. Pat. No. 4,884,859) also heats aligned optical fiber ends to a temperature sufficient to soften the materials and then applies a tension and/or twist to the fiber to thereby form an optical attenuation area having fine cracks that scatter light. A major shortcoming of such techniques is the amount of attenuation is very difficult to control.

Forrester (U.S. Pat. No. 5,142,603) is another example of constructing a fusion splice with a controlled attenuation. Forrester fuses the ends of aligned fiber ends with heat. Once fused, the heat is continued for a time period sufficient to cause dopant to migrate out of the core and result in a desired attenuation.

Lin, et al. (U.S. Pat. No. 5,398,296) constructs a mode filter overlapping the fiber ends such that the fiber ends are parallel and overlapping. These overlapping fiber ends are then welded. Lin slightly separates the fibers to pull and narrow the welded portion. As the fibers are being separated, a power meter is monitored. When the readout reaches an object value, e.g. 3 dB, the process is stopped and the fibers are cooled. A material having a high index of refraction is then applied to the welded portion to form a mode filter.

Emmons, et al. (U.S. Pat. No. 5,588,087) constructs an overlapping fusion attenuator by overlapping two fiber ends to define an overlapped portion of the fibers. Heat is then applied to the overlapped portion by energizing an electric arc for about one second. The transmission loss is then measured and, if greater than a desired loss, the electric arc is turned on again for the same time period. As a result, the cores move closer together in the overlapped portion which results in a reduced transmission loss. This technique has serious shortcomings and can only produce at attenuation of greater than 10 dB. Alternative embodiments produce lower attenuation values by moving the fibers relative to one another in much the same way as described above to change the attenuation value.

SUMMARY OF THE INVENTION

A method of controlling an optical fiber splicing machine utilizes a power control mode to control the amount of power delivered to fuse the fibers. In the power control mode, the attenuation is measured while the fusing process is occurring. A rate of attenuation loss is predicted by an estimator based on the measured attenuation values. This estimator can be an optimal filter or other estimation method. If the rate of attenuation loss indicates that a threshold insertion loss will be crossed before the next attenuation measurement, the splicing machine is stopped prior to the next attenuation measurement. If the desired attenuation is not achieved, an energy control mode is utilized which controls the amount of energy delivered to fuse the fibers. After delivering this energy, the method measures the attenuation. If not within desired values, the energy mode is repeated. At each iteration the splicing control function utilized by the energy control mode may be reprogrammed. A PID control formula may be used to determine the arc current for each iteration. A system for performing the attenuating splice uses, in addition to a optical fiber splicing machine, a laser and power meter to measure insertion loss as well as a controller to implement the splicing methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

Figure 1:
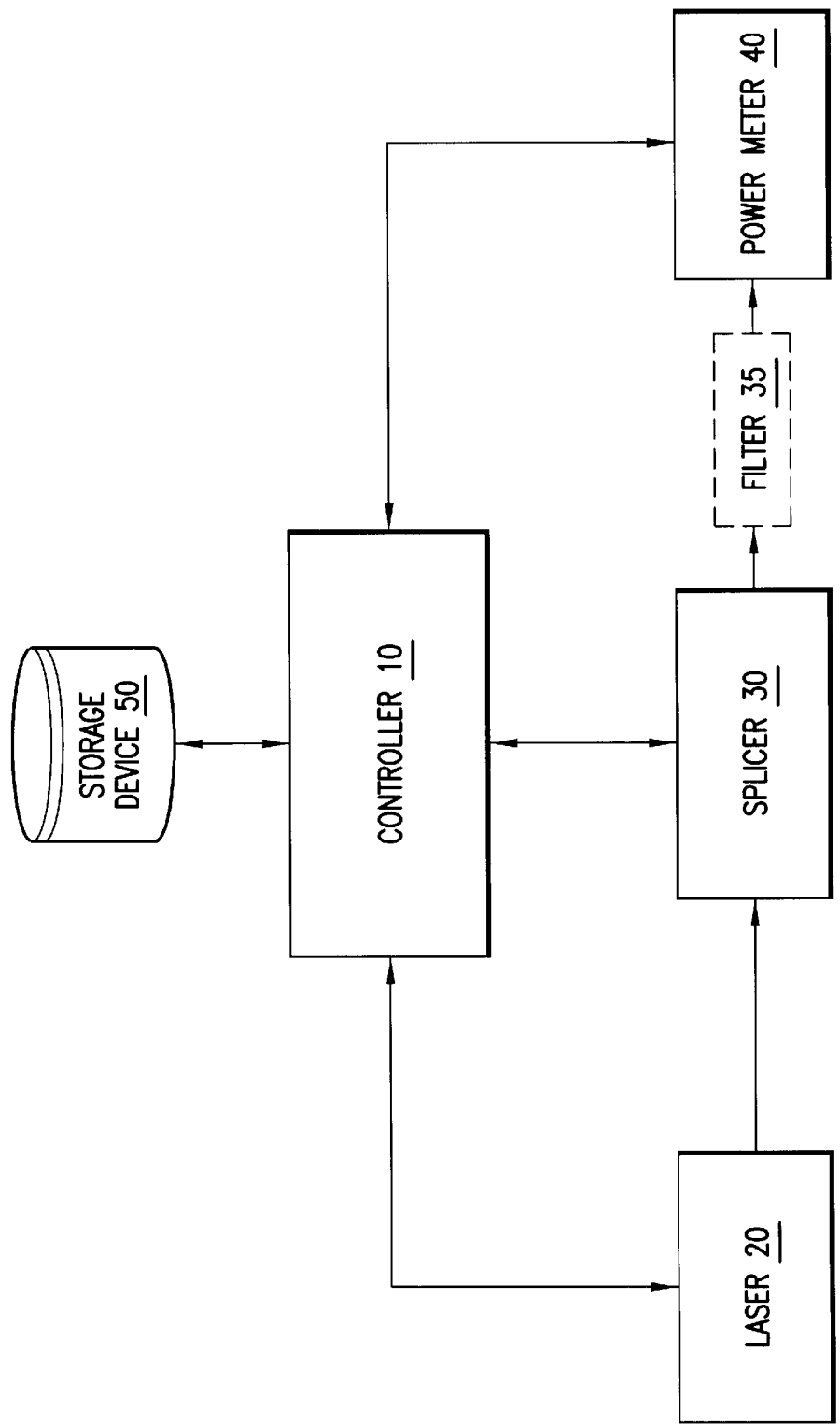
FIG. 1 is a block diagram of a system according to an embodiment of the invention that manufactures an attenuating splice.

FIG. 1 illustrates a system for performing attenuation splicing operations. The system includes a controller 10 operatively connected to a laser 20, splicer 30 and power meter 40. The controller 10 may be constructed, as illustrated in FIG. 1, with a personal computer programmed with software embodying the inventive methods. Alternatively, the controller may be constructed with an ASIC (application specific integrated circuit) or other hardware, firmware and/ or software designed perform the inventive methods. The specific implementation and/or programming of these devices is a routine matter to one of ordinary skill in the art. If the inventive methods are reduced to software, then such software may be written onto a computer disc or another computer-readable medium as further described below.

More specifically, the controller 10 is suitable for programming with the inventive methods. To allow human interaction, the controller 10 may include conventional input devices such as a keyboard and mouse as well as an output device which may include a display such as a cathode ray tube, flat panel display and/or printer.

Preferably, the controller 10 is connected to a storage device 50. The storage device 50 may be a hard disk, floppy disc, optical disc, etc and may also include associated drive and interface circuitry. The storage device 50 may be used to store data as well as a computer program which performs the invention when loaded into the controller 10. As an alternative, the storage device as well as the other components of the system may be connected with a network instead of the direct connections illustrated in FIG. 1.

The computer program embodiment of the invention may be loaded from the storage device 50 into an internal memory of the controller 10. The result is that a general purpose controller 10 is transformed into a special purpose machine that implements the invention.

Even more particularly, each step of inventive method will transform at least a portion of the general purpose controller 10 into a special purpose computer module implementing that step.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Still further, the invention disclosed herein may take the form of an article of manufacture. An article of manufacture is a computer-usable medium, including a computer-readable program code embodied therein wherein the computer-readable code causes controller 10 to execute the inventive methods.

A computer diskette such as storage device 50 is an example of such a computer usable medium. When the disc 50 is loaded into the disc reader of the controller 10, the computer-readable program code stored therein is transferred into the controller 10. In this way, the controller 10 may be instructed to perform the inventive methods disclosed herein.

The laser 20 is connected via a fiber optic cable to the splicer 30. Laser 20 is preferably tunable because insertion loss may vary or otherwise depend upon the operating wavelength. In other words, the controller 10 may control laser 20 to select the wavelength of light emitted by the laser 20. Because laser 20 is used to measure the insertion loss of the splice, selecting the operating wavelength at which the splice is expected to operate will generally increase the accuracy of the insertion loss measurement.

The splicer 30 may also be referred to herein as a fiber optic splicing machine or apparatus. Splicer 30 is a conventional element which permits two optical fibers to be fused. The fused fibers form a splice. To perform the splice, the splicer 30 may include appropriate clamping and micropositioning mechanisms to hold and align the optical fibers. Various detectors are typically used by such splices 30 to measure fiber alignment.

Such splicers 30 also include the ability to offset the optical fibers such that they are not axially aligned. Although the invention is primarily directed to axially misaligned fibers, it is also possible to apply the inventive methods to so-called "overlapped" fibers in which the fibers overlap in the Z direction. Axially misaligned fibers are generally preferred herein because the attenuation properties of the splice are more easily controlled. Nevertheless, overlapped fiber splicing can also be improved with the inventive methodologies.

The splicer 30 includes a device that fuses the fibers. Such fusing devices include an electric arc, a torch (e.g. chlorine mantled oxyhydrogen torch), a laser, and/or other heater that heats the fiber ends to a temperature sufficient to cause fusion thereof. Such fusion devices in the splicer 30 are controlled by the controller 10 to fuse the fibers.

As more specifically described below, this control includes controlling the power and/or energy applied by the fusing device in the splicer 30. If an electric arc is being used, the power and energy can be conveniently controlled by adjusting the fusing current I and fusing time t. For example, the power P (rate of energy delivery) delivered by an electric arc type fusing device may be expressed as $P=I^2R$ and the energy delivered E may be expressed as $I^2Rt$ where R is the resistance across the arc and t is the time period in which the power P is delivered. In other words, the energy E is an integration of the power over time. The controlled parameters include I and t. It is to be understood that the various other type of fusing devices can be controlled by the invention to deliver a desired amount of power and/or energy.

If a laser is used as the fusing device in splicer 30, then an optional optical filter 35 may be used to filter out the fusing device laser wavelengths and permit the measuring laser 20 wavelengths to be accurately detected by the power meter 40. Filter 35 may be used for other purposes as described below in the operational section and may comprise multiple filter elements.

Power meter 40 is optically connected to the splicer 30 via, for example, one of the fibers being spliced. Power meter 40 is also a conventional element in and of itself and generally has the capability of measuring or otherwise detecting the degree of attenuation across the splice (insertion loss, which may be measured in decibels (dB)). The controller 10 inputs or receives one or more insertion loss values from the power meter 40.

The operation of a first embodiment of the invention will now be described in reference to FIGS. 2–8. Further embodiments will be described in relation to FIGS. 9–18 below.

Figure 2:
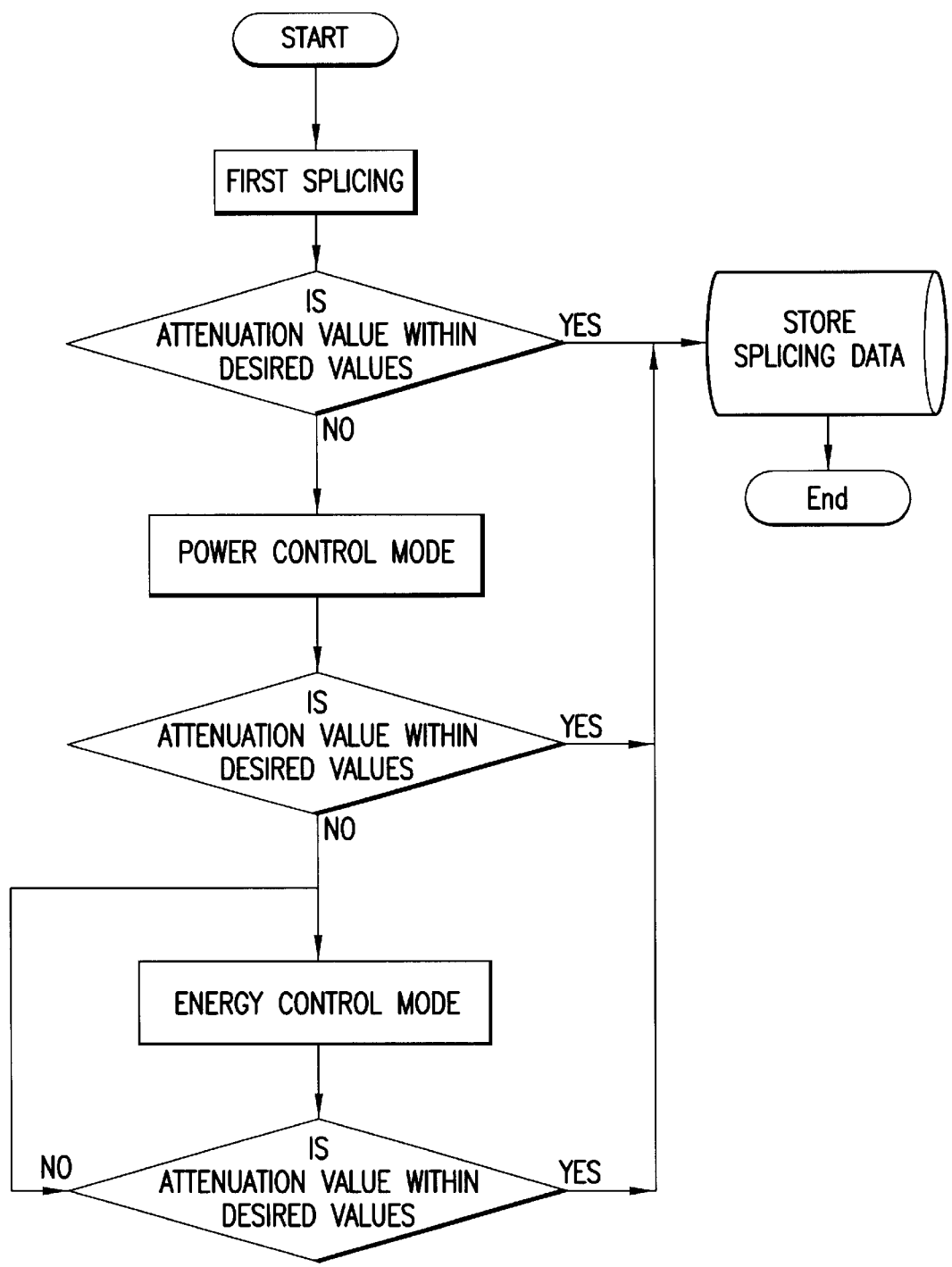
FIG. 2 is a high level flow diagram showing a combined power mode and energy mode control method according to an embodiment of the invention for performing attenuation splicing.

The high-level flowchart of FIG. 2 illustrates a combined methodology in which the inventive power control mode and energy control mode are utilized in conjunction and to advantage. This combined method may begin with a first splicing process which is a conventional splicing process that splices two fibers together. There is a chance, albeit quite small, that the conventional splicing operation will produce a splice with the desired insertion loss. This small probability is tested and, if the splice has an attenuation value within the desired values, splicing data is stored by the controller 10 in the memory device 50 and the process ends.

The splicing data stored in FIG. 2 includes a splicing recipe. Conventional splicing operations typically utilize a splicing recipe which may include a large number of parameters. These parameters include various fiber properties such as fiber type, core diameter, cladding diameter, etc. If the first splice happens to produce a desired attenuation at the operating wavelength for the particular fibers being splice, then the method stores this data in storage device 50 for future use. However, the repeatability and/or predictability of such recipes is very poor and may be due, in part, to varying environmental and/or splicing machine conditions. For example, wearing of the electrodes of an electric-arc-type splicer will change the attenuation value of a splice even if the same fibers having the same properties are fused.

If the first splice does not produce a splice with the desired attenuation value, which is almost all cases, the method will proceed to the power control mode. Alternatively, the first splice and decision step may be skipped altogether with the resulting method starting with the power control mode.

The power control mode, in general, controls the amount of power delivered to the fibers during the splicing operation. For example, the power of an electric-arc-type splicer 30 may be controlled by controller 10 commanding the splicer 30 to deliver a current I to the electric arc. The power control mode measures the splice insertion loss while the fusion is occurring. This controller 10 performs this measurement by energizing laser 20 while controlling splicer 30 to fuse the fibers. Power meter 40 reads the attenuation across the splice and either outputs the attenuation value to the controller 10 or makes the value available for retrieval by controller 10. Further details of the power control mode will be explained in reference to FIG. 3.

The combined method then checks whether the attenuation value is within the desired values. If so, then splicing data is stored by the controller 10 in the memory device 50 and the process ends. If not, the controller enters the energy control mode the details of which are explained in reference to FIG. 3.

Although it is possible for the energy control mode to produce a splice with the desired attenuation upon a single iteration, the energy control mode is usually a repetitive process and, for that reason, is also referred to as a repeat mode. This is illustrated in FIG. 2 with the loop that is formed by the decision step following the energy control mode. The energy control mode is repeated until the attenuation value of the splice is within the desired values. Unlike the power control mode, the energy control mode preferably measures the attenuation after the splice is performed. In other words, the energy control mode preferably waits until the splice is completed and, perhaps, cooled before taking an attenuation reading from the power meter 40.

Figure 3:
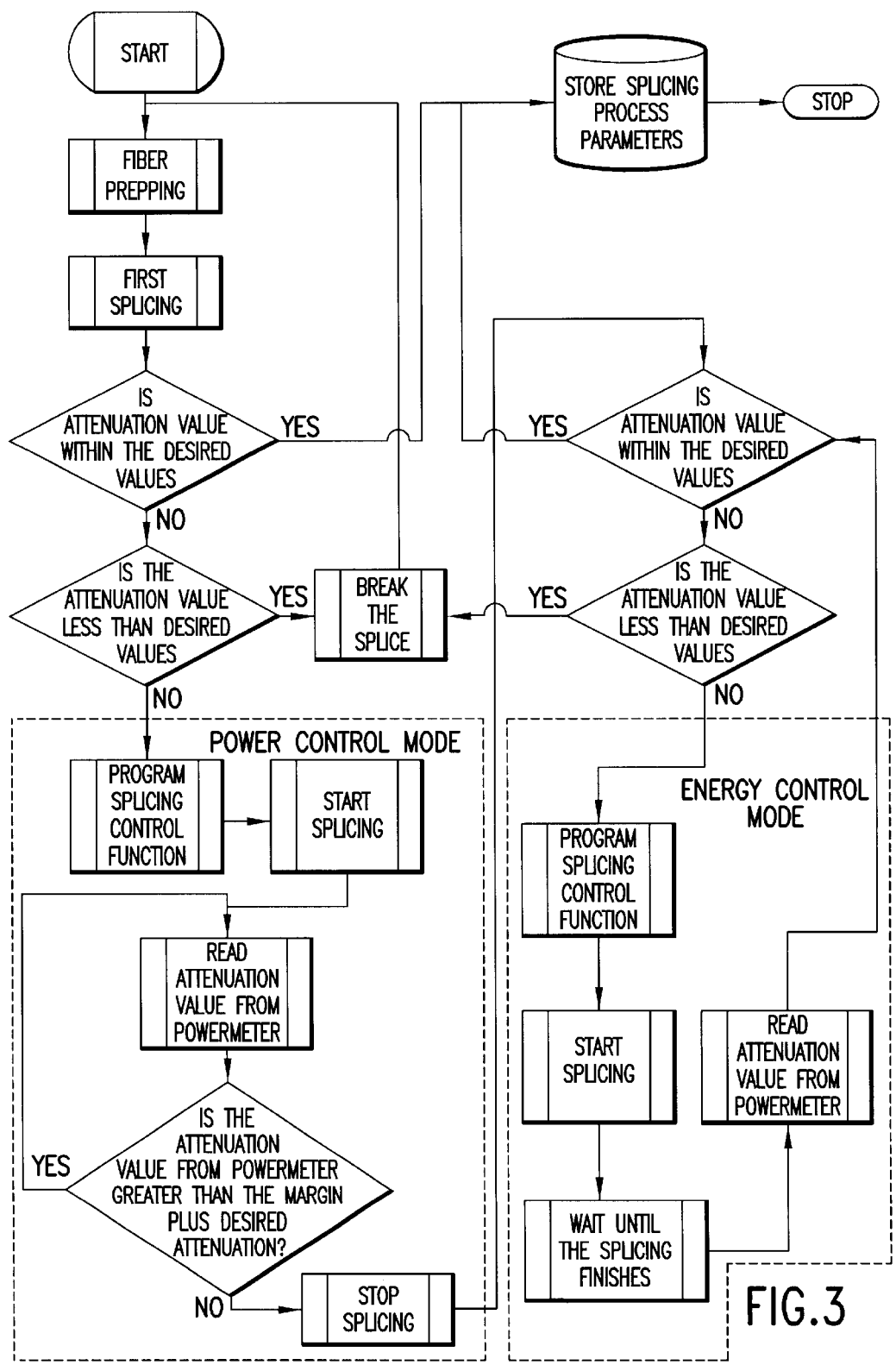
FIG. 3 is a lower level flow diagram showing details of a combined power mode and energy mode control method according to an embodiment of the invention for performing attenuation splicing.

FIG. 3 shows further details of the combined methodology illustrated in FIG. 2. As shown therein, the first splicing process includes a fiber prepping step that prepares the fibers for splicing by, for example, stripping the fiber optic cables and cleaning the fibers. A first splicing step may then be performed utilizing conventional splicing techniques and recipes. The first splicing step may be skipped altogether as mentioned above with the resulting method skipping from fiber prepping to the power control mode.

If the first splicing step is retained, then there is a small chance that the conventional splicing step will produce a splice with the desired insertion loss. This small probability is tested and, if the splice has an attenuation value within the desired values, splicing data is stored by the controller 10 in the memory device 50 and the process ends.

Then, the method determines whether the attenuation value is less than the desired value. If yes, then the splice must be broken and the process restarted because the following processes may only reduce and not increase the attenuation. If no, the power control mode is initiated.

The power control mode, as further illustrated in FIG. 3, programs the splicing control function. This may be accomplished by the controller 10 programming splicer 30. The splicing control function includes a recipe for the particular fibers being splices.

In addition, the splicing control function includes a power level and a margin value. The power level is indicative of the amount of power delivered by the fusing device of splicer 30 to the fibers being spliced. If an electric-arc splicer 30 is being used, the power level may be conveniently controlled by controlling the current I supplied to the fusing arc.

The margin value accounts for the transient and highly variable attenuation fluctuations (referred to herein as a "transient attenuation difference value") that occur after the fusing device of splicer 30 is turned off. Such fluctuations are caused, at least in part, by the changing surface tension as the fused portion transitions from a high-temperature melting status to a low-temperature solid status. Thus, the margin value is greater than or equal to a transient attenuation difference value. The transient attenuation difference value may be quite a large value and can cause the measured attenuation value to differ by more than 1 dB. The specific transient attenuation difference value varies with, for example, the type of fiber and even with different fiber vendors supplying the same fiber type.

The margin value may also be used to compensate for communication delays that exist between the splicer 30, power meter 40 and controller 10.

In addition, the margin value may be used to compensate for noise. For example, white noise from an electric arc type fusing device can affect the attenuation measurement. The margin value can account for this, as well as other noise parameters. Alternatively, a optical filter 35 may be optionally inserted into the optical path that exists between splicer 30 and power meter 40. This optical filter 35 may be used to filter the white noise from an electric arc type fusing device in splicer 30.

The margin value is used in the power control mode as follows. After programming the splicing control function, the controller 10 commands the splicer 30 to start the splicing operation. As the splice is occurring, laser 20 injects light across the splice and power meter 40 measures the attenuation. Controller 10 receives or inputs the measured attenuation and then determines whether this measurement is greater than the margin value plus the desired attenuation. If yes, the controller 10 commands splicer 30 to continue the splicing operation at a commanded power level. If not (measurement≦margin+desired attenuation), then the splicing operation is stopped.

Figure 7:
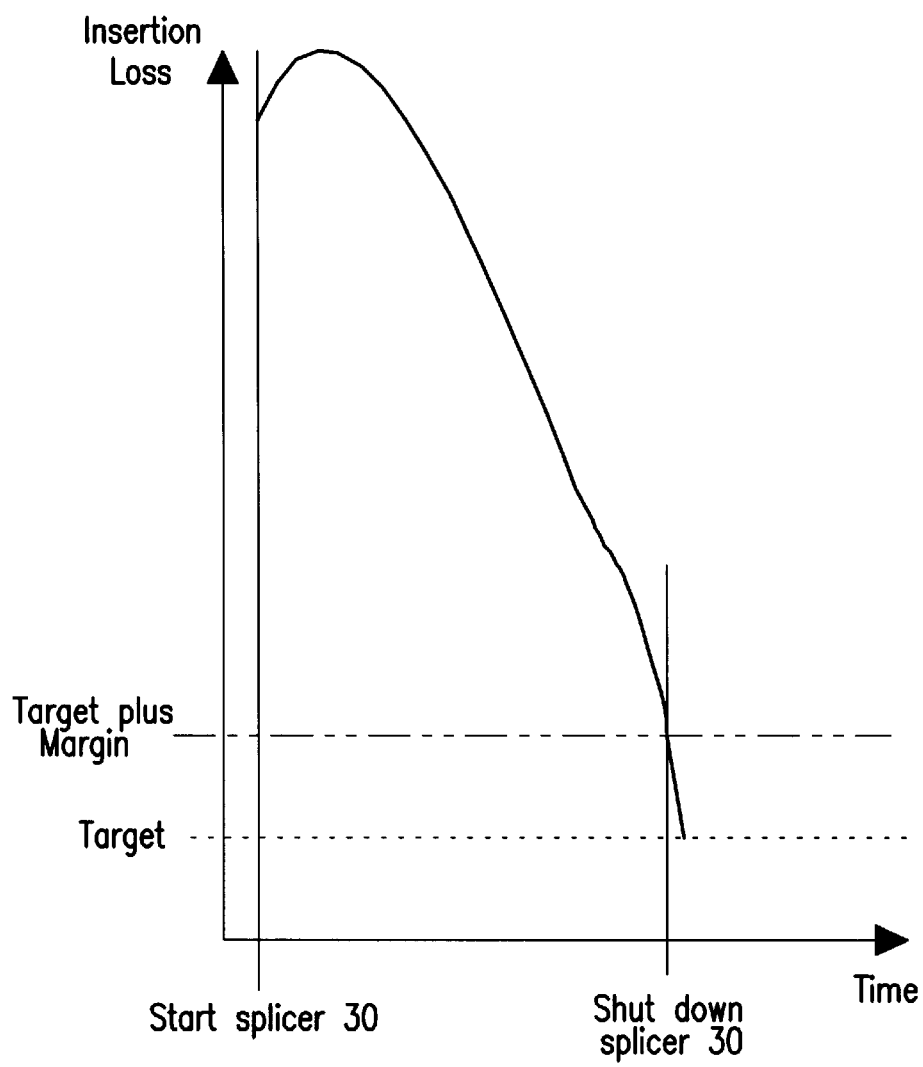
FIG. 7 is a graph showing insertion loss versus time and illustrating various concepts of the invention.

FIG. 7 is a graph of measured insertion loss versus time and further illustrates the power control mode and the invention's use of a margin value. The curve shown in FIG. 7 represents a insertion loss measurement taken during the fusing operation in the power control mode. When the fibers melt, the curve begins a downward trend towards the target (desired attenuation value) which is indicated by the dotted line. The margin value is added to the target to set a threshold which is indicated by the dashed-dot chain line. Controller 10 monitors the measured insertion loss and determines when the measured insertion loss crosses the threshold (target+margin). When this happens, controller 10 commands splicer 30 to stop the splicing operation which shuts down the fusing device of splicer 30 (which is why this mode is also referred to as a shutdown mode). The remainder of the curve (following the shut down time) illustrates the transient attenuation difference value.

The curve shown in FIG. 7 is for illustration purposes only. The shape of the curve, margin value, and shutdown time are highly variable and dependent upon a wide variety of factors. The variability of this curve is indicative of the problems facing conventional splicing techniques and the resulting poorly controlled amount of attenuation in the resulting splice. The invention overcomes these problems by dynamically measuring and controlling the splicing process. By controlling the power level and setting an appropriate margin value, the invention shuts down the splicing operation at a precisely controlled time and produces a splice having an attenuation value that is quite close if not equal to the desired attenuation value.

As further shown in FIG. 3, after shutting down the splicer 30 in the power control mode, the method proceeds by checking whether the attenuation value is within the desired values. If yes, the method has been successful and the process parameters are stored by the controller 10 in the memory device 50. The measurement for this check is preferably taken after the splice has cooled sufficiently to eliminate any significant transient attenuation.

If not, the method checks whether the attenuation value is less than desired values. This is done because the method may only be able to decrease and not increase the attenuation. If the power control mode has gone too far, the splice is broken and the process begun anew. If not, then the energy control mode is initiated.

As mentioned above, the energy control mode preferably measures the insertion loss after each successive splicing operation in the energy mode control loop. Of course, only one iteration may be required to produce a good splice. These objects are illustrated in FIG. 3 which shows the energy control mode method that begins with programming the splicing control function. In the energy control mode, the splicing control function includes a recipe as well as an energy level indicative of the energy to be delivered by the splicer 30's fusing device. If an electric arc is being used as the fusing device, the energy level may be conveniently set by controlling the current I and time period in which the current I is supplied to the fusing device of splicer 30.

Once programmed, the splicing operation is started by the controller 10. The method then waits for the splicing to finish which may include waiting for the splice to cool. An attenuation measurement may then be taken by energizing the laser 20 and reading the insertion loss with power meter 40. The controller 10 then inputs or receives this measured attenuation value and subjects this value to the tests described above. If these tests determine that the measured attenuation value is less than the desired value, then the energy control mode is repeated.

At each iteration of the energy control mode, the splicing control function may need to be reprogrammed. This is a result of the dynamic characteristics of the splicing control function which may change as the difference between target and actual attenuation changes.

Figure 4:
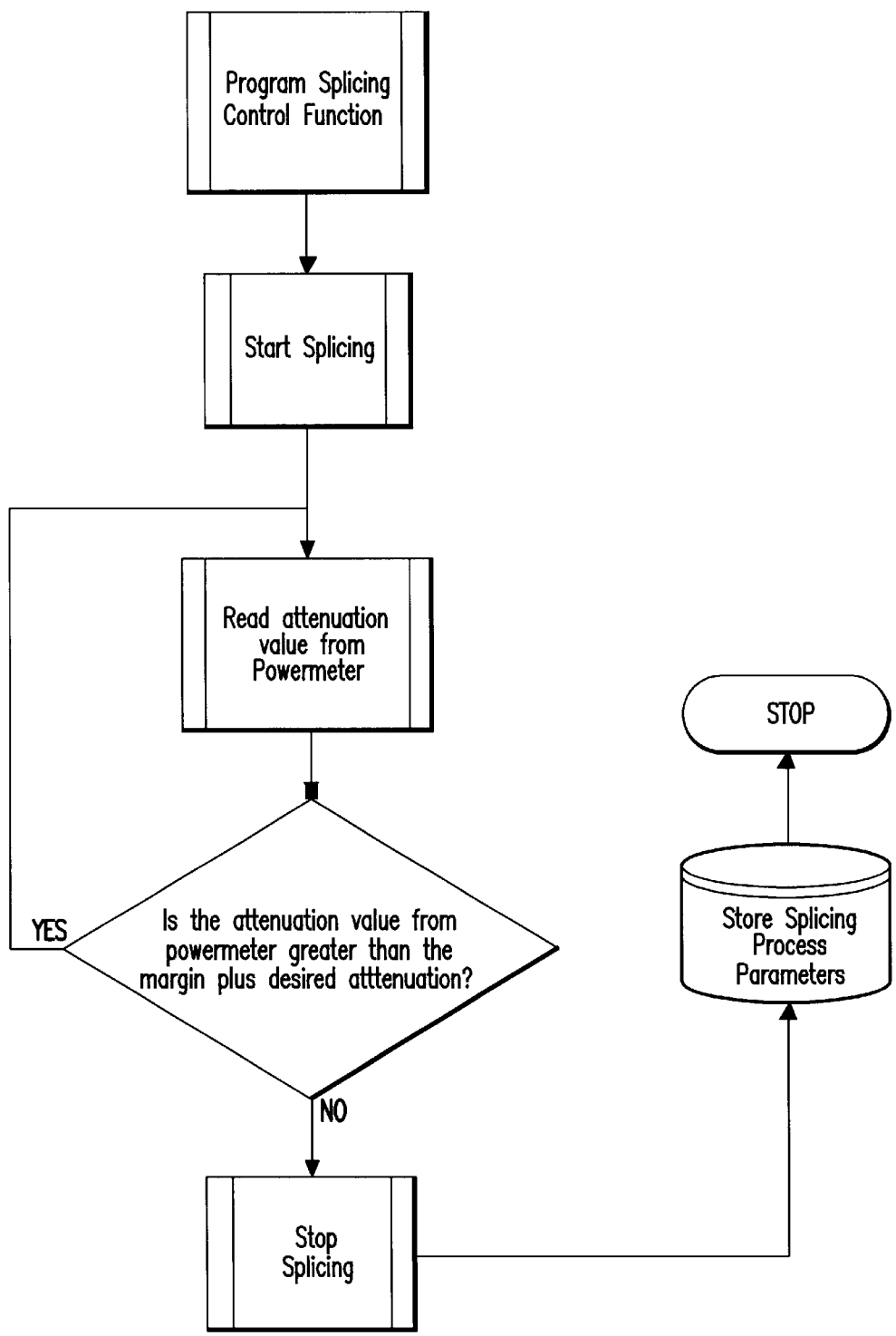
FIG. 4 is a lower level flow diagram showing details of a power mode control method according to an embodiment of the invention for performing attenuation splicing.

The power control mode may also be a stand-alone process as illustrated in FIG. 4. Following standard fiber prepping, the power control mode illustrated in FIG. 4 may be utilized to splice fibers. The details of each step in this process are described above and will not be repeated here. It is important to recognize, however, that the power control mode may be used independently of the energy control mode. It is generally preferred to use a combination of power and energy control modes examples of which are shown in FIGS. 3 and 4.

Figure 5:
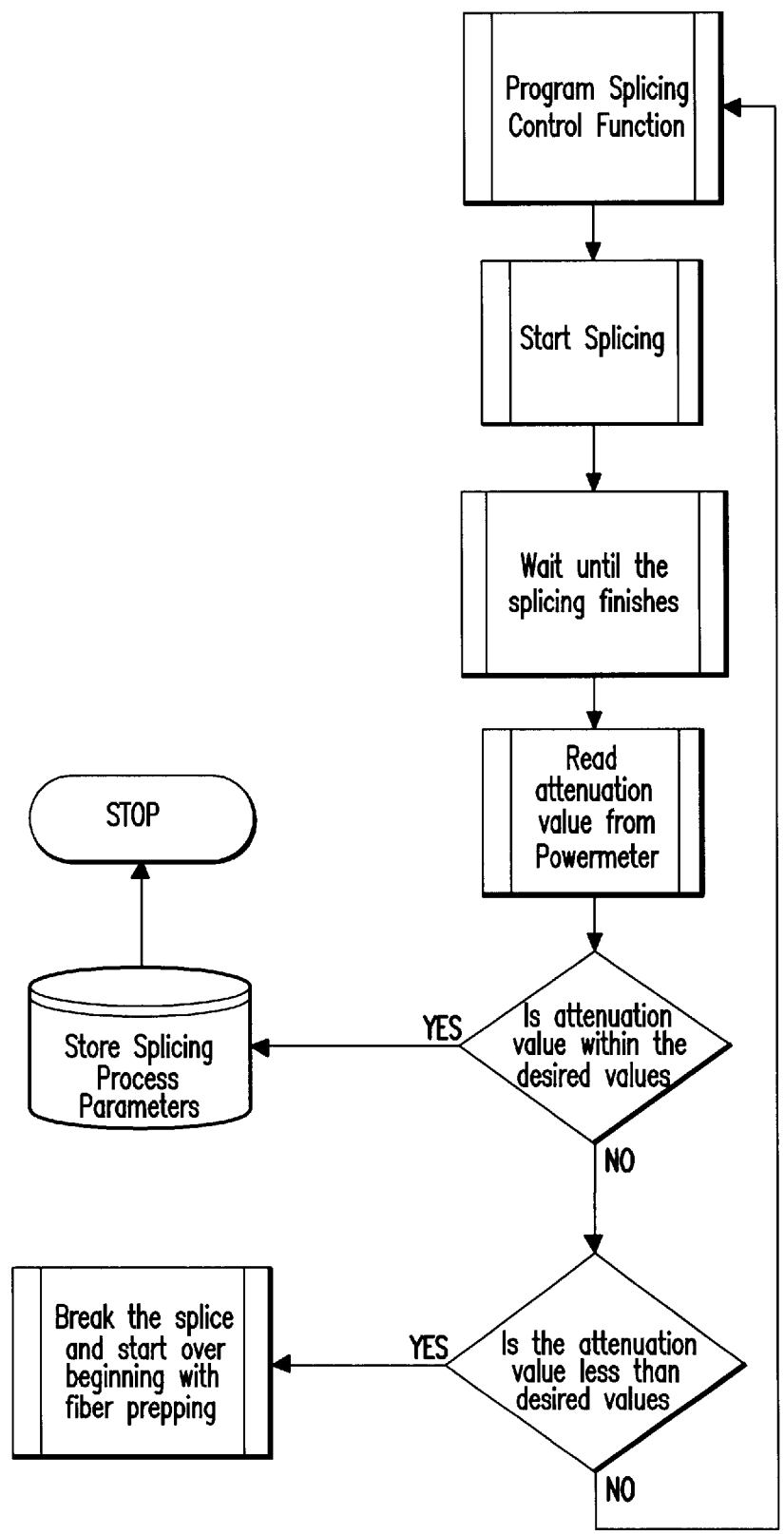
FIG. 5 is a lower level flow diagram showing details of an energy mode control method according to an embodiment of the invention for performing attenuation splicing.

Like the power control mode, the energy control mode may also be a stand-alone process as illustrated in FIG. 5. Following standard fiber prepping, the energy control mode illustrated in FIG. 5 may be utilized to splice fibers. The details of each step in this process are described above and will not be repeated here. It is important to recognize, however, that the energy control mode may be used independently of the power control mode.

Figure 6:
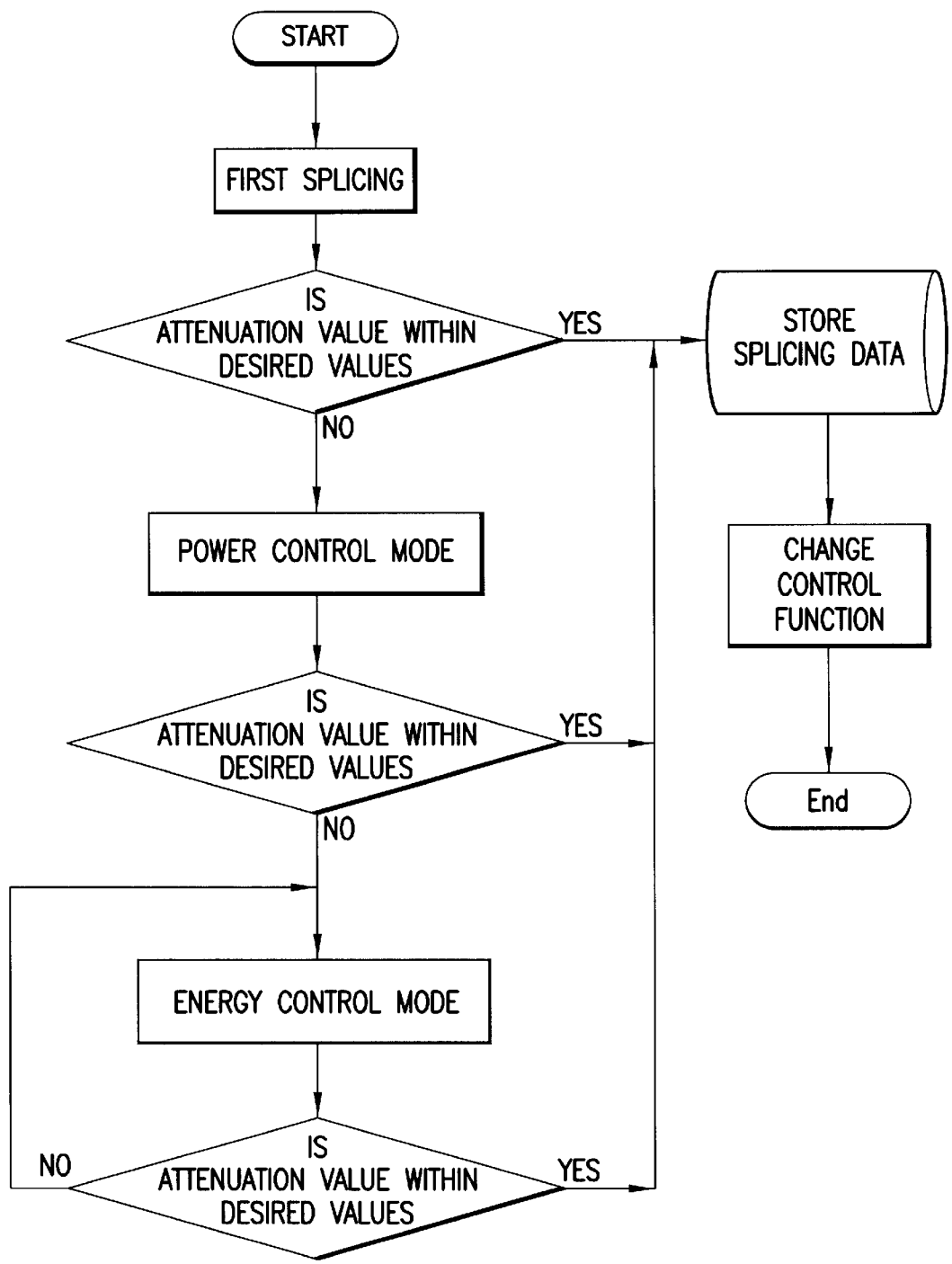
FIG. 6 is a high level flow diagram showing an alternative, combined power mode and energy mode control method having a learning function according to an embodiment of the invention.

FIG. 6 illustrates an alternative method that combines both power and energy control modes. The main difference between FIGS. 2 and 6 is the addition of a change control function step. The inventive methods generate splicing data which may be stored as indicated in FIGS. 2–6 or at any other point in the process. This splicing data may be used, as illustrated in FIG. 6 to update or otherwise change the control functions. These control functions may include the splicing control functions utilized by the power and/or energy control modes. In this way, the invention adapts or learns as splicing operations are performed.

Figure 8:
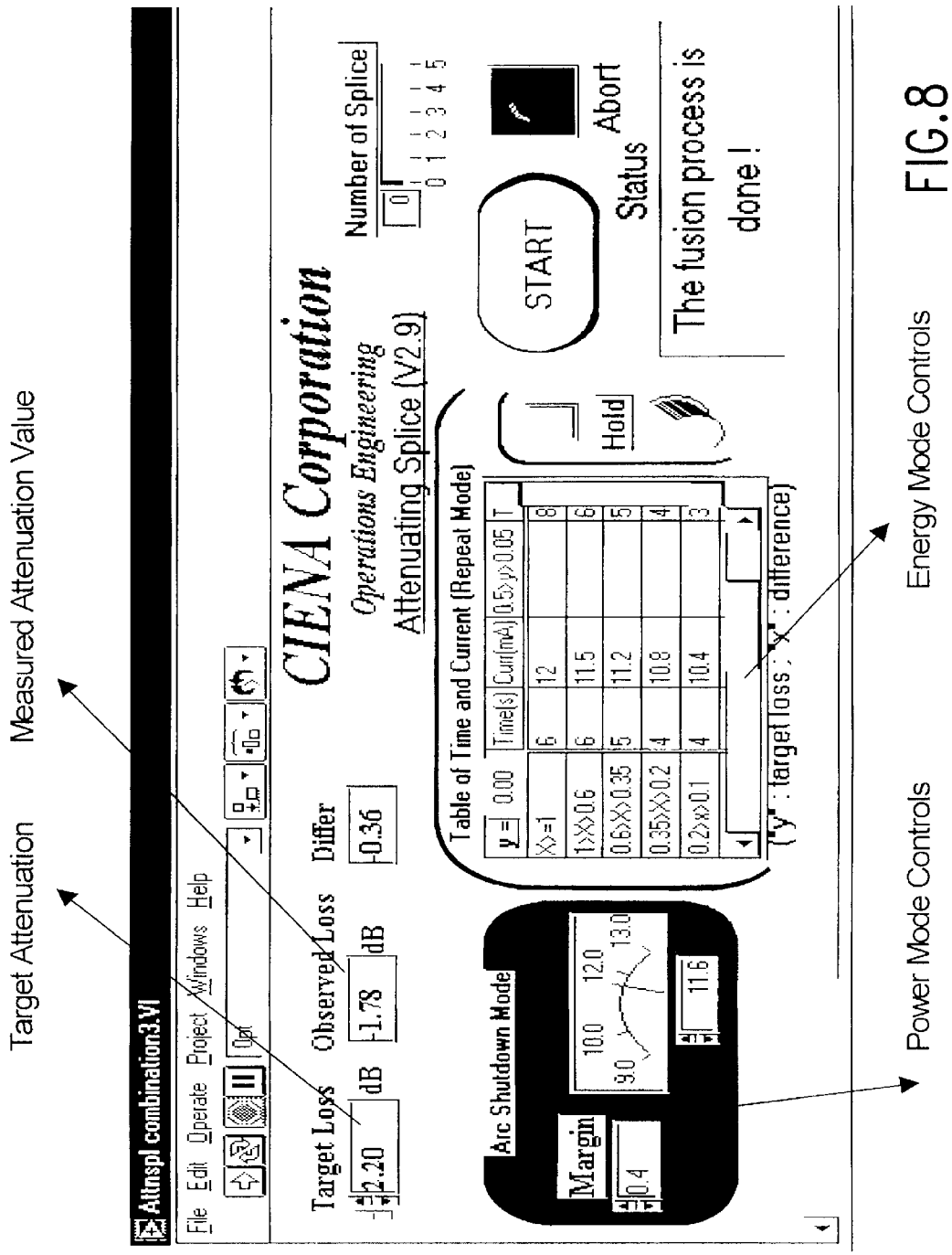
FIG. 8 is an exemplary screen display according to an embodiment of the invention.

FIG. 8 is an example of a screen display that may be generated by the invention. This screen display may be generated by the controller 10 and sent to an appropriate display device. In this way, an operator may conveniently interact with the invention. As shown in FIG. 8, the target loss or target attenuation value may be set by the operator. The observed loss shows the attenuation measured by the power meter 40. The difference therebetween is also conveniently displayed.

FIG. 8 also illustrates an example of power mode controls which may include the margin value and power level (e.g. current I). Illustrative energy mode controls are also shown including target loss Y and difference X (the difference between target loss and measured loss). As shown in the table, the energy level (e.g. time and current) changes depending upon both the target loss and difference. In other words, the energy level may change if the difference value X changes even with the same target value. This further illustrates that the energy control mode may need to change the splicing control function at each iteration even thought the target value is constant. The number of iterations (number of splice) is also indicated by the screen display of FIG. 8. Messages and other control buttons (e.g. Hold and Start) may also be provided as further shown in FIG. 8.

The first embodiment utilizes a margin value that accounts for the transient and highly variable attenuation fluctuations (referred to herein as a "transient attenuation difference value") that occur after the fusing device of splicer 30 is turned off. Typically, the margin value is set at a value that is greater than (or perhaps equal to) the largest transient attenuation difference value that may be expected.

As mentioned above, such fluctuations are caused, at least in part, by the changing surface tension as the fused portion transitions from a high-temperature melting status to a low-temperature solid status. The transient attenuation difference value may be quite a large value and can cause the measured attenuation value to differ by more than 1dB.

The specific transient attenuation difference value varies with, for example, the type of fiber and even with different fiber vendors supplying the same fiber type. As further mentioned above, the margin value may be used to compensate for noise. For example, white noise from an electric arc type fusing device can affect the attenuation measurement. The margin value can account for this, as well as other noise parameters.

The second embodiment includes algorithms that estimate the transient attenuation difference value which is also called the "final jump" value because the measured attenuation value takes a final jump after the splicer 30 is turned off.

Figure 13:
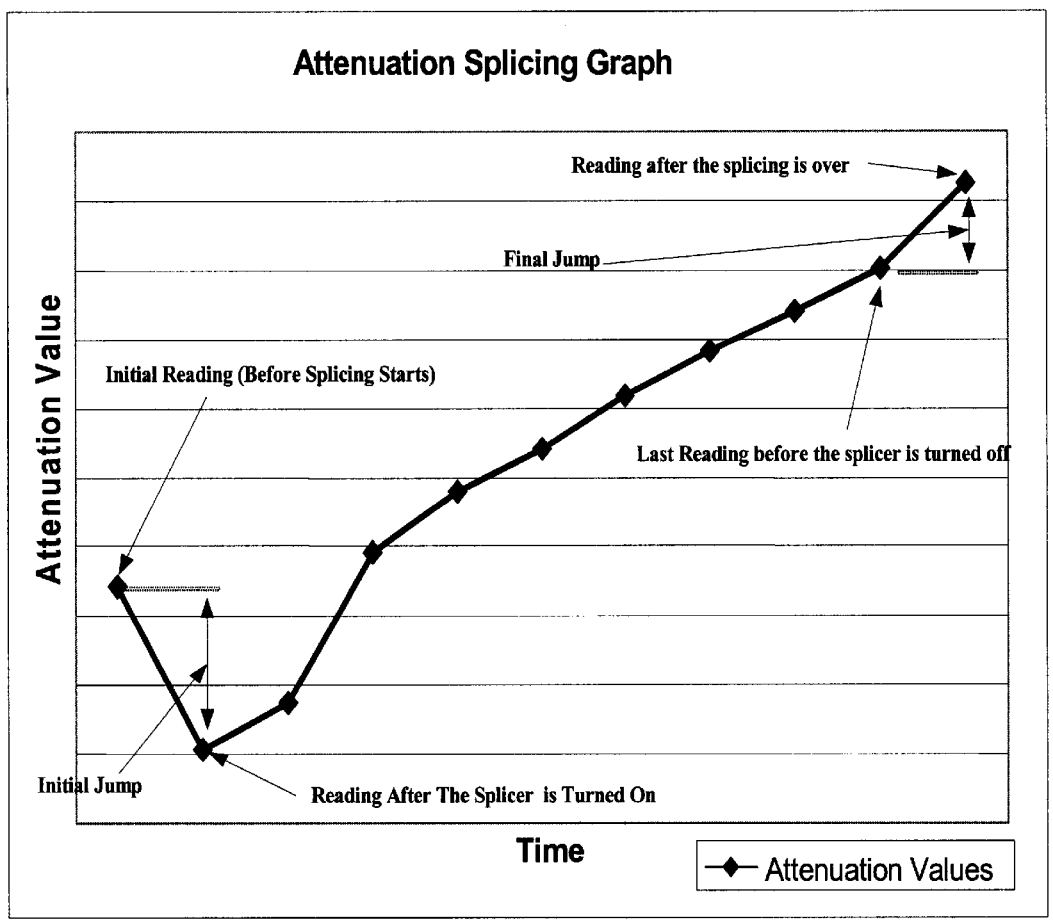
FIG. 13 is an attenuating splicing graph for illustrating concepts of the invention.

FIG. 13 illustrates the final jump. The attenuation splicing graph of FIG. 13 also shows the attenuation value (negative values are graphed) as a function of time during the attenuation splicing process. The diamond shaped indicia indicate attenuation values read by power meter 40.

Preferably an initial reading is taken before splicing starts. The attenuation value typically drops off sharply once splicing starts as shown in FIG. 13. This drop-off or initial jump may be measured by taking the difference between the initial reading and a reading just after the splicer 30 is turned on. The attenuation value then begins to fall (the graph plots negative attenuation values). From these values, the rate of change or slope can also be determined. As further shown in FIG. 13, the final jump may be measured by taking the difference between the reading just before the splicer 30 is turned off and just after.

It was discovered that a mathematical algorithm can be used to estimate the final jump value and thereby control the splicer 30 more accurately than the first embodiment. With these new algorithms, the optimal splicing parameters can be estimated in real-time and intelligent control schemes can be utilized to maximize the yield of the process while reducing dependence upon a human operator.

In general, the algorithms estimate the "Final Jump" and are used by controller 100 to stop the attenuation splicing process at the correct time to achieve the desired attenuation.

Figure 9:
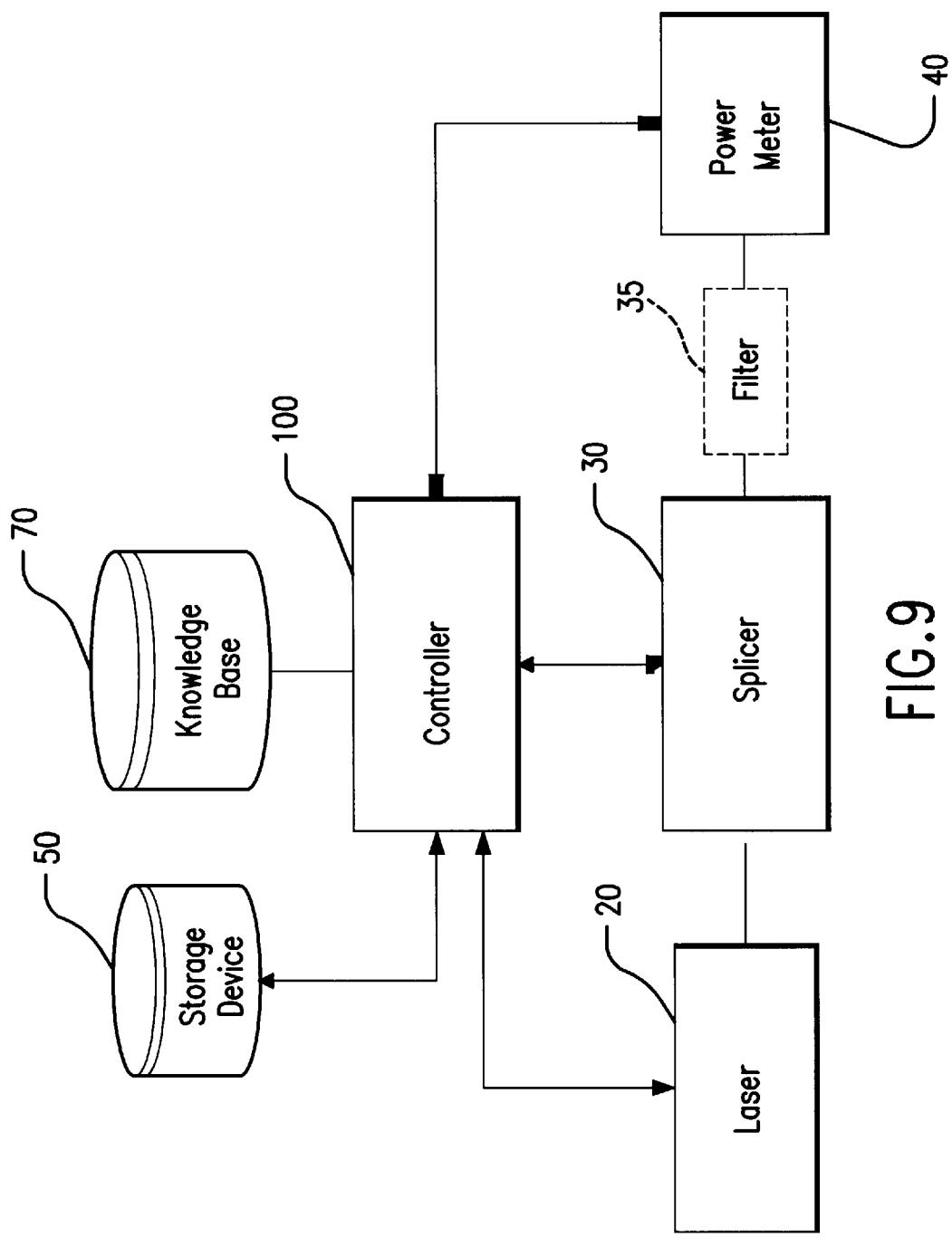
FIG. 9 is a block diagram of another system according to an embodiment of the invention that manufactures an attenuating splice.
Figure 12:
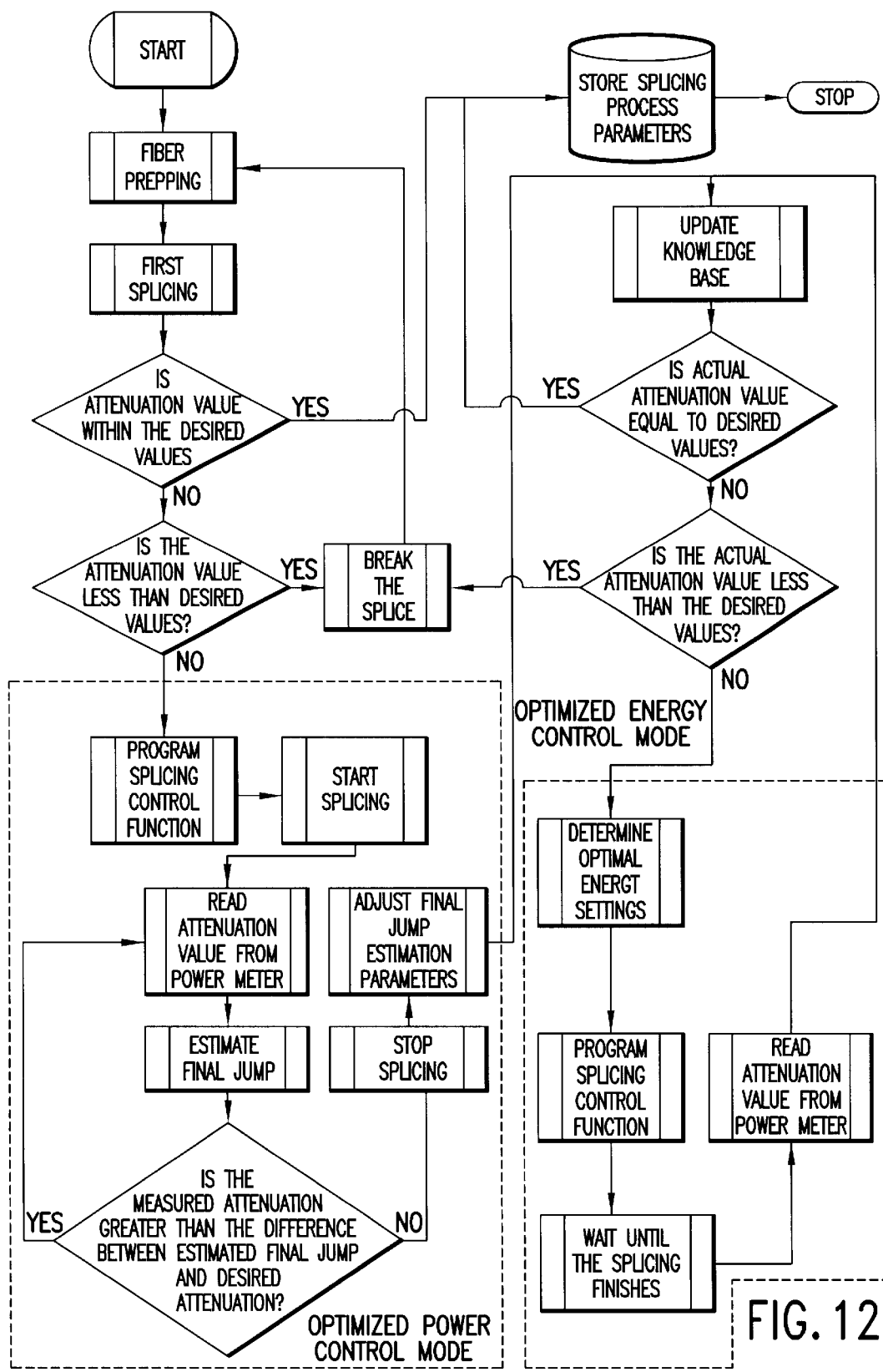
FIG. 12 is a lower level flow diagram showing details of a combined power mode and energy mode control method according to an embodiment of the invention for performing attenuation splicing.

FIG. 9 illustrates a system architecture that can be utilized to apply these algorithms and control splicer 30. FIG. 9 is quite similar to FIG. 1 so the differences will be highlighted. In FIG. 9, a controller 100 is programmed with different control techniques that apply the inventive algorithms to control splicer 30. Furthermore, a knowledge base 70 is operatively connected to controller 100 and utilized in a manner more particularly described below. A particular implementation of controller 100 is shown in FIG. 12 and also described below. Before turning to these implementations and the operation thereof the algorithm will be explained.

As mentioned above, it was discovered that certain algorithms are quite useful for controlling the attenuation splicing process. Specifically, it was discovered that the following variables or estimation parameters affect the calculation of the final jump value:

$A_i$=Initial attenuation reading, before the splicing process starts $A_d$=Desired attenuation value at the end of the splicing process $J_i$=Initial Jump (difference between initial reading before splicing stops and reading just after splicing starts)

$J_f$=Final Jump (difference between final reading and value just before splicing is stopped)

$S(t)$=slope of attenuation (or insertion loss) at a given time t $w(t)$=Process Noise term (e.g. compensates for uncontrollable process parameters such as fiber index changes)

v(t)=Measurement Noise term (e.g. compensates for measurement errors such as sensor errors)

In order to achieve the desired attenuation value, the invention estimates the final jump $J_f$. If this value can be estimated accurately, the attenuating splice process can be stopped when the difference between the desired attenuation value and actual sensor reading is equal to estimated final jump value $J_f$. The relationship can be characterized as a non-linear and time-varying function (Equation 1):

$$J_f = f(A_i, A_d, J_i, S(t), w(t)) + v(t)$$

where f(.) is a non-linear function.

This function may be further defined using statistical techniques from collected splice data and/or theoretical studies.

After collecting such splice data and performing such theoretical studies it was further determined that the primary or main factors affecting the final jump $J_f$ estimation are $A_i$, the initial attenuation reading before the splicing process starts; $A_d$, the desired attenuation value at the end of the splicing process and $J_i$, the Initial Jump (difference between initial reading before splicing stops and reading just after splicing starts). This relationship may be stated as Equation 2 as follows:

$$J_f = f(A_i, A_d, J_i) + aS(t) + b$$

where variables "a" and "b" are constant estimation parameter values.

After further studies it was determined that the final jump value is strongly related to the initial jump value. Moreover, the main contributing factors to the final jump value are the initial jump, the initial attenuation reading, and the desired attenuation. Specifically, the initial jump and the difference between the initial attenuation reading and the desired attenuation are the most influential factors when determining the final jump value. This relationship may be represented as Equation 3 as follows:

$$J_f = f(A_i, A_d, J_i)$$

In one control scheme, the controller 100 measures the initial jump by taking an insertion loss reading just before and just after the splicer 30 is commanded to begin the attenuation splicing. With the initial jump reading, the initial attenuation reading, and the desired attenuation value, the controller 100 can calculate a rough estimate of the final jump value $J_f$.

This initial rough estimate can then be fine tuned by using Equation 2 which includes the slope S(t). The slope S(t) can be measured once the splicing operation begins and the controller 100 can collect at least two data points from the power meter 40.

The estimation can be further refined by applying Equation 1 which includes the noise terms including noise term w(t) which is the Process Noise term that compensates for uncontrollable process parameters such as fiber index changes and noise term v(t) which is the Measurement Noise term that compensates for measurement errors such as sensor errors (e.g. power meter 40 errors).

Another useful product of the algorithms is the ability to control the attenuation splicing rate. When the rate of change S(t) is too steep then a communication delay between power meter 40, controller 100 and splicer 30 may cause the system to miss the target or final attenuation value $A_d$.

Therefore, controller 100 may also monitor the slope S(t) to determine whether the attenuation splicing is progressing too fast. If so, then the controller 100 commands splicer 30 to slow down the splicing process by, for example, reducing the power applied by a fusing device of splicer 30. If an electric arc type fusing device is utilized then this may be done by adjusting the current I until the slope S(t) is within desired parameters. These desired parameters are dependent upon the system utilized and can be determined by one of ordinary skill in the art given a particular system.

Although it is possible to further define the functions in Equations 1, 2 and 3 a priori utilizing theoretical studies, these functions are quite variable and dependent upon a large number of factors. Therefore, the preferred method of further defining these functions is through statistical studies of actual attenuation splicing operations involving a variety of different fibers and conditions. This may be done by utilizing the knowledge base 70 which gathers data from an array of actual attenuation splicing operations that is used by controller 100 to adjust the estimation parameters. The more splicing operations that are studied in this way the more accurate the estimation of the final jump value becomes.

More specifically, an intelligent controller such as a fuzzy logic, neural net or expert system based system may be used to adjust the parameters of the estimation function to compensate for uncontrollable process parameter changes. An architecture useful for such adjustment is shown in FIG. 10.

Figure 10:
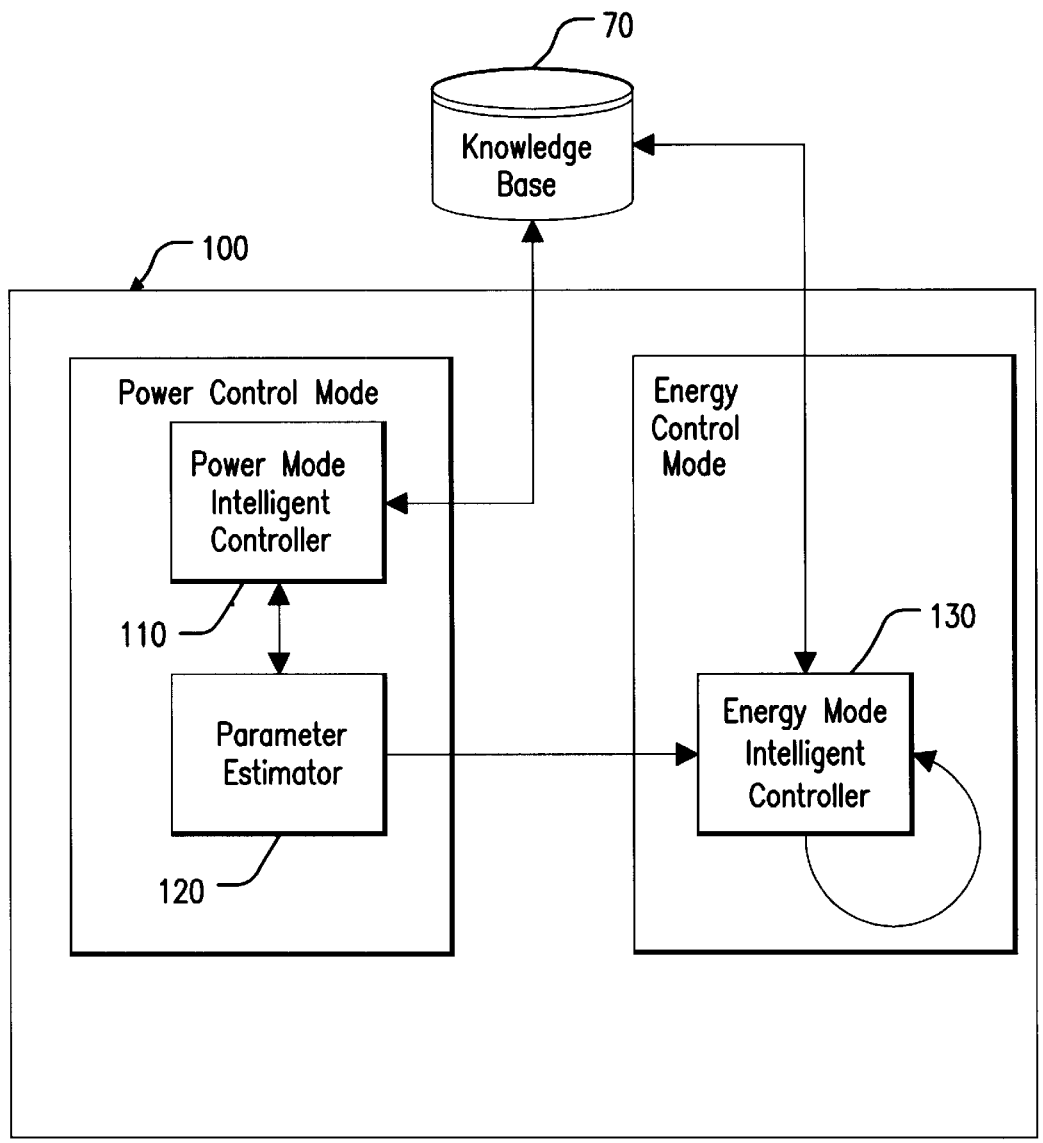
FIG. 10 is a block diagram of an intelligent control and knowledge base architecture according to an embodiment of the invention.

FIG. 10 illustrates an architecture for controller 100 and includes both power mode and energy mode control sections. A power mode intelligent controller 110 is operatively connected to knowledge base 70 and parameter estimator 120. Furthermore, an energy mode controller 130 is operatively connected to the knowledge base 70 and parameter estimator 120. An arrow connecting energy mode intelligent controller 130 to itself denotes a feedback loop that is more particularly described below.

In general, the power mode intelligent controller 110 manages the splicing system and controls splicer 30 during the power control mode. As the splice is being performed, the power mode intelligent controller 110 uses the attenuation readings from power meter 40 to recalculate the final jump $J_f$ and control the splicer 30 by adjusting the power being applied and shutting down the splicer 30 at the appropriate time. Further details of this control regime are described in relation to FIGS. 11 and 12 below.

The parameter estimator 120 utilizes the data gathered during the most recent as well as past splicing operations to modify the equation parameters. In other words, parameter estimator 120 refines the specific equations (Equations 1, 2 and/or 3) utilized by the controller 100 to calculate the final jump $J_f$.

If the power or "shutdown" mode does not achieve the desired attenuation, the controller 100 enters the energy or "repeat-mode". In the repeat mode, the energy mode controller 130 determines optimal energy (e.g. time and current settings) based on the data collected during the shutdown mode. The energy or repeat mode continues until the desired attenuation is achieved. During each of these repetitions of the energy mode, the energy mode controller 130 also takes into account data collected from the previous repeat-mode splicing and data from the shutdown mode to more accurately control the attenuation splicing process. The feedback of data from one iteration to the next is indicated by the feedback loop shown in FIG. 10.

A primary goal of the parameter estimator 130 is to adjust estimation parameters based on the shut-down module data collected. The energy mode intelligent controller 130 determines the optimal energy (e.g. time and current settings) for the repeat mode based on the information from shut-down mode and, if any, previous repeat mode splicing.

Figure 11:
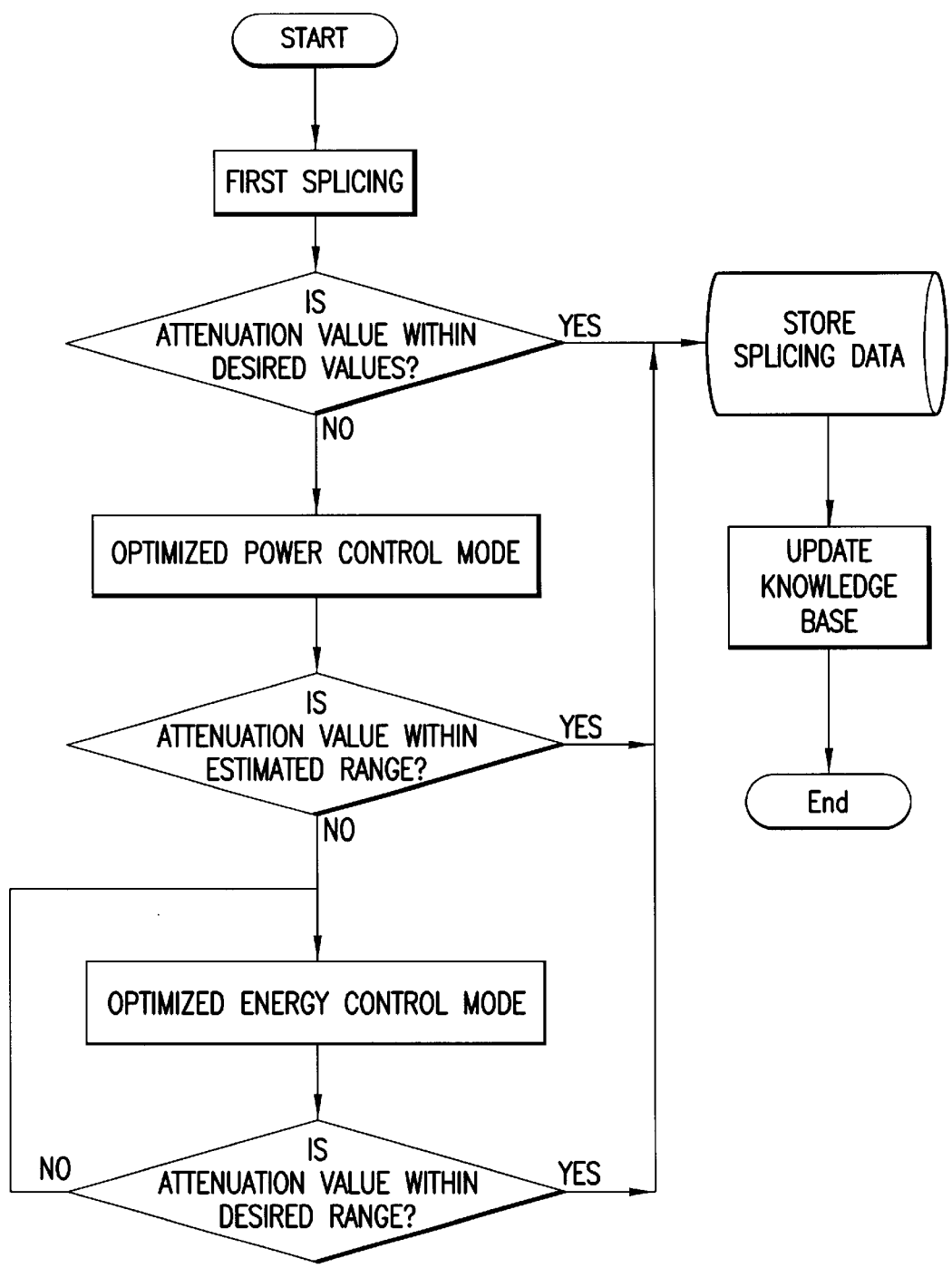
FIG. 11 is a high level flow diagram showing another combined power mode and energy mode control method according to an embodiment of the invention for performing attenuation splicing.

FIG. 11 is a high level flowchart illustrating how the optimized power and energy modes operate. The term "optimized" is used herein to describe the operation of controller 100 of the second embodiment applying Equations 1, 2, and/or 3 to improve the attenuation splicing process when compared with the first embodiment.

FIG. 11 is similar to FIG. 2 which is a high-level flowchart illustrating a combined methodology according to the first embodiment in which the inventive power control mode and energy control mode are utilized in conjunction and to advantage. Because of these similarities the differences therebetween will be highlighted below.

These differences include the "optimized" power control mode which applies Equations 1,2 and/or 3 to estimate the final jump and control the shutdown of the splicer 30 instead of using a margin value to control shutdown as in the first embodiment. The optimized power control mode also recalculates the final jump as the splicing operation continues and as measured insertion loss values and other data are collected by controller 100. In addition, the optimized power control mode updates estimation parameters used to calculate the final jump.

The optimized power and energy control modes also build the knowledge base 70. The knowledge base 70 stores process data collected during the splicing operation. These data include, but are not limited to, the initial jump, the final jump, the slope of the attenuation curve, and the total splicing time. The knowledge base 70 is preferably updated after every splice (i.e. after each shutdown (power control) mode or repeat (energy control) mode).

An example of the knowledge base 70 than can be used for the shutdown mode is as follows: If the controller 100 overshoots the desired attenuation due to a large slope during the shutdown mode, the intelligent controllers 110 and 130 may update the knowledge base 70 by increasing the constants a and b in the estimation algorithm. This change will increase the estimated value of the final jump on the next splice and hence it will shutdown the splicing operation sooner to avoid overshooting.

The optimized energy control mode also determines optimal energy settings at each iteration of the energy control mode.

Other differences are described generally above and are further explained in relation to FIG. 12 below.

FIG. 12 has many similarities with FIG. 3 most notably in the steps before the optimized power control mode which are identical to those shown in FIG. 3. Therefore, a description of these steps will be omitted here.

The optimized power control mode, as further illustrated in FIG. 12, programs the splicing control function. This may be accomplished by the controller 10 programming splicer 30. The splicing control function includes a recipe for the particular fibers being splices.

In addition, the splicing control function includes a power level and a margin value. The power level is indicative of the amount of power delivered by the fusing device of splicer 30 to the fibers being spliced. If an electric-arc splicer 30 is being used, the power level may be conveniently controlled by controlling the current I supplied to the fusing arc.

Instead of using a margin value to account for the transient and highly variable attenuation fluctuations (referred to herein as a "transient attenuation difference value") that occur after the fusing device of splicer 30 is turned off, the second embodiment utilizes Equations 1,2 and/or 3 to calculate the transient attenuation difference value (final jump).

The final jump value is calculated and used in the optimized power control mode as follows. After programming the splicing control function, the power mode intelligent controller 110 within controller 100 commands the splicer 30 to start the splicing operation. As the splice is occurring, laser 20 injects light across the splice and power meter 40 measures the attenuation. Power mode intelligent controller 110 receives or inputs the measured attenuation and then starts calculating the final jump using Equations 1,2, 3 and/or 3. If Equation 3 is being used, then the initial jump reading is all that is needed by power mode intelligent controller 110 to calculate the final jump value. As the splicing operation continues, additional readings are taken which can be used by power mode intelligent controller 110 to refine or recalculate the final jump value.

After estimating the final jump, controller determines whether the measured attenuation is greater than the difference between the estimated final jump and the desired attenuation. If yes, the power mode intelligent controller 110 commands splicer 30 to continue the splicing operation at a commanded power level. If not (measurement≦desired attenuation−final jump), then the splicing operation is stopped.

After stopping the splicing operation, the parameter estimator 120 within controller 100 adjusts the final jump estimation parameters. The adjustment to the final jump estimation parameters can be performed in a variety of ways. Statistical techniques can be applied by controller to refine the terms (estimation parameters) of the equations, specifically by accounting for the data collected on the just-completed splice. Alternatively, controller 100 can add to the knowledge base 70 and otherwise employ knowledge base 70 to refine the estimation parameters by using an expert system, neural network, fuzzy logic or other intelligent control regime.

FIG. 13 is a graph of measured attenuation values versus time and further illustrates the optimized power control mode. The curve shown in FIG. 13 represents insertion loss measurements (attenuation values) taken during the fusing operation in the optimized power control mode. The curve shown in FIG. 13 is for illustration purposes only. The shape of the curve, initial jump, and final jump are highly variable and dependent upon a wide variety of factors. The variability of this curve is indicative of the problems facing conventional splicing techniques and the resulting poorly controlled amount of attenuation in the resulting splice. This embodiment overcomes these problems by dynamically measuring and controlling the splicing process. By controlling the power level and calculating the final jump value, the invention shuts down the splicing operation at a precisely controlled time and produces a splice having an attenuation value that is quite close if not equal to the desired attenuation value.

As further shown in FIG. 12, after shutting down the splicer 30 in the power control mode, the method proceeds by updating the knowledge base 70 with data collected from the recently-completed splice. This data includes the insertion loss values, initial jump value, final jump calculations, and actual final jump which can be used to refine the estimation parameters as well as to determine optimal energy settings in the optimized energy control mode.

After updating the knowledge base 70, the method proceeds by checking whether the attenuation value is within the desired values. If yes, the method has been successful and the process parameters are stored by the controller 100 in the memory device 50. The measurement for this check is preferably taken after the splice has cooled sufficiently to eliminate any significant transient attenuation.

If not, the method checks whether the attenuation value is less than desired values. This is done because the method may only be able to decrease and not increase the attenuation. If the optimized power control mode has gone too far, the splice is broken and the process begun anew. If not, then the optimized energy control mode is initiated.

As mentioned above, the optimized energy control mode preferably measures the insertion loss after each successive splicing operation in the optimized energy mode control loop. Of course, only one iteration may be required to produce a good splice. These objects are illustrated in FIG. 12 which shows the optimized energy control mode method that begins with determining optimal energy settings. The knowledge base 70 can be utilized to advantage by the energy mode intelligent controller 130 to determine the optimal energy settings.

The energy mode intelligent controller 130 may use the knowledge base 70 to determine the optimal energy settings using current and historical process data. Process data may be manipulated by the intelligent controller 130 by using fuzzy logic in which membership functions are applied and analyzed using fuzzy logic rule bases. This way, optimal settings for time and current may be determined.

An example of one repeat mode fuzzy logic rule that can be applied by the energy mode intelligent controller 130 is as follows: If the attenuation slope during the shutdown mode is "large" and the difference between the desired and current attenuation value is "small" then the current is "small" and fusion time is "short".

The "large", "small" and "short" terms represent fuzzy membership functions for the perspective process and control variables. The results of knowledge base rules may be merged together and de-fuzzified to obtain "crisp" values for the control variables (i.e. current and time). In this way optimal settings for the repeat mode may be determined.

Next, the method programs the splicing control function into the splicer 30. In the optimized energy control mode, the splicing control function includes a recipe as well as an energy level indicative of the energy to be delivered by the splicer 30's fusing device. If an electric arc is being used as the fusing device, the energy level may be conveniently set by controlling the current I and time period in which the current I is supplied to the fusing device of splicer 30.

Once programmed, the splicing operation is started by the energy mode intelligent controller 130. The method then waits for the splicing to finish which may include waiting for the splice to cool. An attenuation measurement may then be taken by energizing the laser 20 and reading the insertion loss with power meter 40. The energy mode intelligent controller 130 then inputs or receives this measured attenuation value and subjects this value to the tests described above. If these tests determine that the measured attenuation value is less than the desired value, then the optimized energy control mode is repeated.

At each iteration of the energy control mode, optimal energy settings are re-determined and the splicing control function may need to be reprogrammed. This is a result of the dynamic characteristics of the splicing control function which may change as the difference between target and actual attenuation changes.

As mentioned above the power and energy control modes may also be a standalone process as illustrated in FIGS. 4 and 5. The same is true for the optimized power and energy control modes. The details of each step in these stand-alone processes are described above and will not be repeated here. It is important to recognize, however, that the optimized power and energy control modes may be used independently of one another. It is generally preferred to use a combination of power and energy control modes examples of which is shown in FIGS. 11 and 12.

Figure 14:
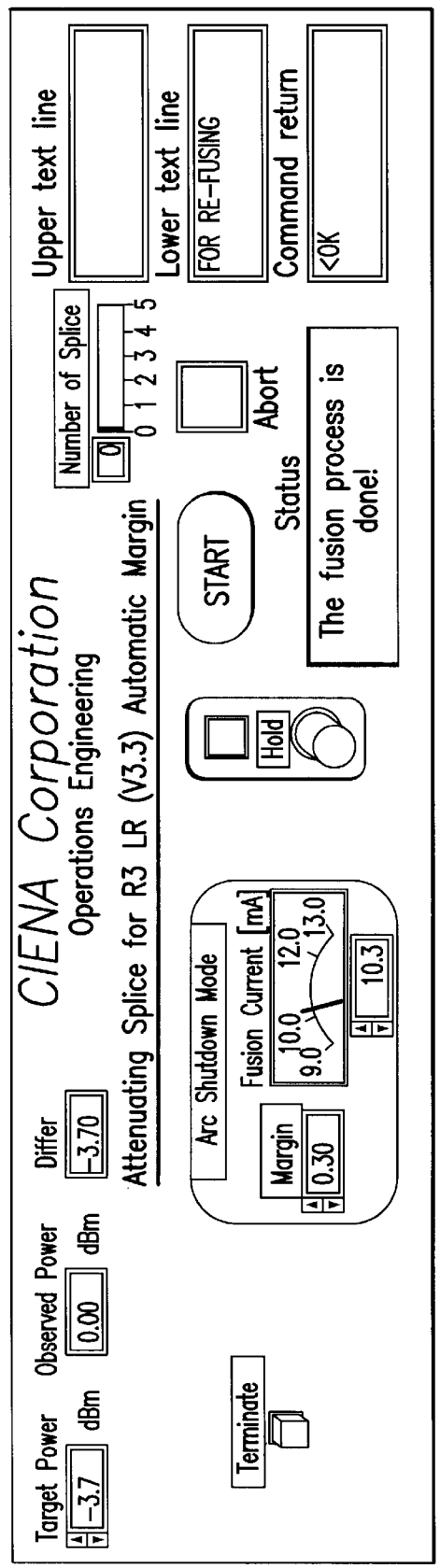
FIG. 14 is another exemplary screen display according to an embodiment of the invention.

FIG. 14 is an example of a screen display that may be generated by the second embodiment of the invention. This screen display may be generated by the controller 100 and sent to an appropriate display device. In this way, an operator may conveniently interact with the second embodiment of the invention.

As shown in FIG. 14, the target power (target loss or target attenuation value) may be set by the operator. The observed power (loss) shows the attenuation measured by the power meter 40. The difference therebetween is also conveniently displayed.

FIG. 14 also illustrates an example of energy mode controls including margin, fusion current settings and readings. The number of iterations (number of splice) is also indicated by the screen display of FIG. 8. Messages and other control buttons (e.g. Hold, Start Terminate, and Abort and various text lines) may also be provided as further shown in FIG. 14.

Figure 15:
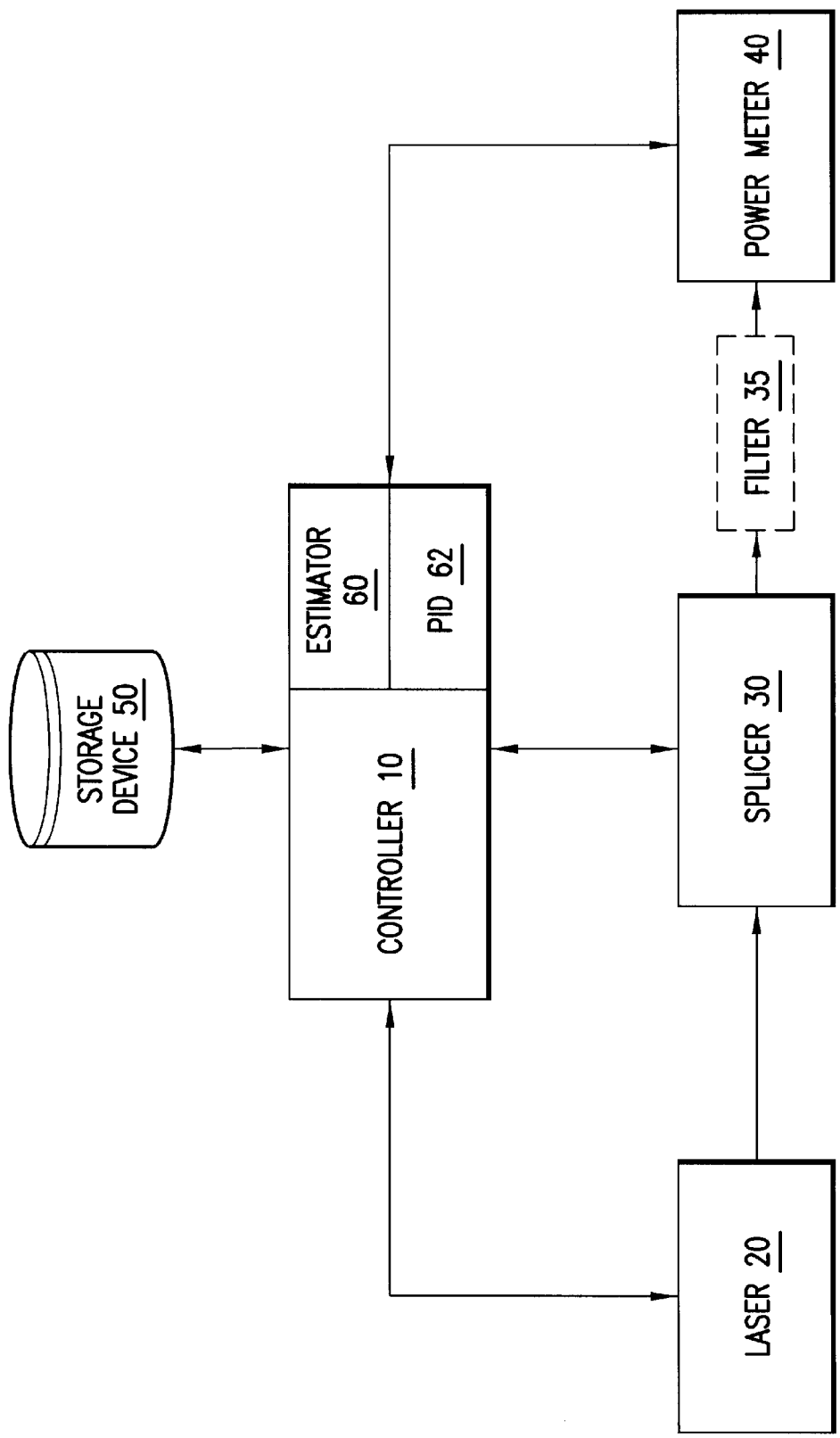
FIG. 15 is a block diagram of a system according to an embodiment of the invention that manufactures an attenuating splice in accordance with an alternative embodiment.

In an alternative embodiment, a method is provided for accurately predicting the rate of attenuation loss of a splice, as the attenuation loss approaches the target attenuation value. Referring to FIG. 15, a system for performing attenuation splicing operations is provided wherein the system is similar to the system of FIG. 1 with the exception that controller 10 implements an estimator 60 and/or a PID controller 62.

Although the inventive methodologies described hereinabove control the attenuation values for fiber splices, these methodologies do not fully compensate for measurement error caused by delays in communication during splicing process. Such delays may be attributed to the insufficient measurement sampling rate and/or the delay between the time when the threshold is reached and the time when the command of shutting down the splice machine is executed. Although this delay is very small, it is not negligible in that even a 0.1 second delay is critical to meeting tolerances. As a result, extra compensation (in dB) is added when the program determines the stop splicing point based on the reading from the power meter. An estimator 60 is applied to the splicing process to compensate for this measurement error.

In order to compensate for the measurement error, an estimator 60, which is used to estimate the state of a system from a measurement that contains some random error, is applied during power control mode which measures the splice insertion loss during splicing operations. In accordance with an embodiment of the invention, the rate of attenuation loss of a splice, $s_k$, as the attenuation loss approaches the attenuation target value is estimated in the following manner. Measurements are taken to estimate the rate of attenuation loss of a splice, $s_k$, as the attenuation loss approaches the target attenuation value for multiple times k, wherein k=1, 2, . . . , n and wherein the measurements are taken at equally spaced points in time up to the present time n. The values $s_k$ are discrete values of the measured slope S(t) described above.

The present measured rate of attenuation loss can be approximated by $L_n-L_{n-1}$, K=1, . . . , n, where $L_k$ is a measured loss at a time point k. Using a first order approximation yields $$s_n = s_{n-1} + Z_{n-1} - Z_{n-2} + w_n,$$

where $w_n$ is a white noise modeling error. The present measured rate of attenuation loss $Z_n$ can then be approximated by:

$$Z_n = L_n - L_{n-1} + V_n,$$

wherein $V_n$ is measured white noise at present time n. Using a design of experiment method, a variance of model noise (c1) and a variance of measurement noise (c2) are then selected. Exemplary values for c1 and c2 are 0.0025 and 0.0081, respectively. Values for c1 and c2 are dependent upon a variety of factors such as type and model to the splicer machine. It is understood that different values may be used in various applications and the invention is not limited to these specific values. Once these values have been determined, an estimator 60 estimates the rate of attenuation loss. The estimator may be implemented using an optimal filter such as a kalman filter. For example, an estimator, such as a kalman filter, can be used as follows:

$$K=p_{k-1}/(p_{k-1}+c_1),$$

$$P_k=(1-K)*p_{k-1}+c_2,$$

$$s_k=s^p_{k-1}+K*(Z_k-s^p_{k-1}),$$

$$s^p_k=s_k+Z_k-Z_{k-1},$$

wherein, $p_k$ is the estimation error covariance, K is the kalman filter gain and $s^p_k$ is the prediction of the rate of attenuation loss as the attenuation loss approaches the target value.

Figure 16:
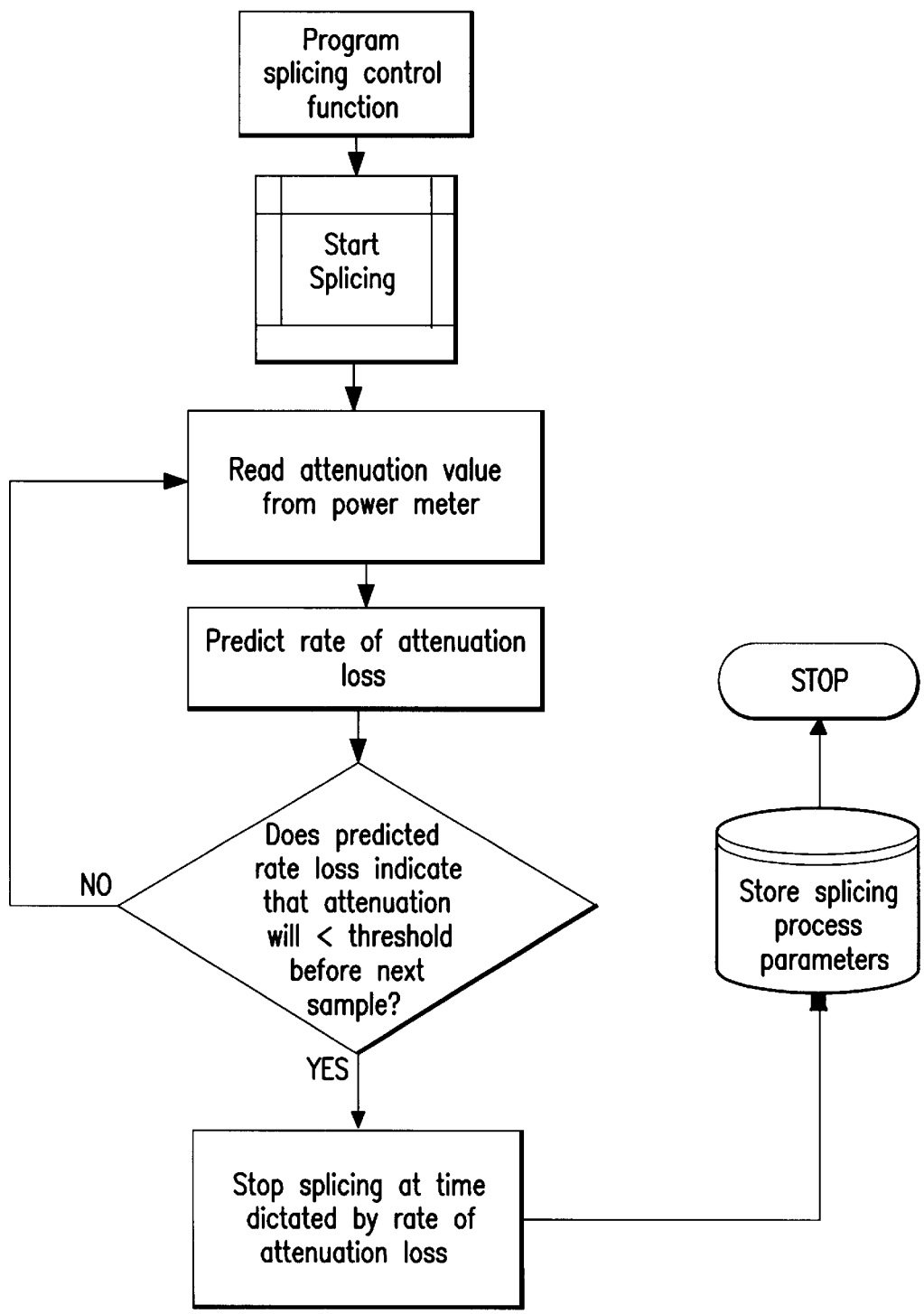
FIG. 16 is a lower level flow diagram showing details of a power mode control method using an estimator according to an alternative embodiment for performing attenuation splicing.

FIG. 16 depicts a power control mode including an estimation operation. As shown in FIG. 16, an estimation process is initiated when the splicing operation is begun. As described above, the estimation operation predicts the rate of attenuation loss. This predicted rate of attenuation loss is then examined so as to determine if the attenuation will be less than the desired attenuation threshold before the next sample measurement. If it is determined that the attenuation value will be less than the desired attenuation threshold, then splicing will be terminated at the time indicated by the predicted rate of attenuation loss. In this scenario, controller 10 determines the time when the insertion loss will cross the threshold and commands the splicer 30 to stop the splicing operation at this time. However, if it is determined that the attenuation value will be greater than the desired attenuation threshold, then the attenuation value is re-measured and applied to estimator 60 so as to create a new predicted rate of attenuation loss, $s^p_k$. This process is repeated until it is determined that the attenuation value will be less than the desired attenuation threshold before the next sampling point.

The threshold used in the process shown in FIG. 16 may be the target plus margin value shown in FIG. 7 or may take into consideration the estimate of the final jump value indicative of the transient attenuation change that occurs after the fiber optic splicing apparatus is shut down as described with reference to FIG. 13. In either scenario, the prediction of the rate of attenuation loss is used to determine whether to stop the splicing device before the next sampling point.

Figure 17:
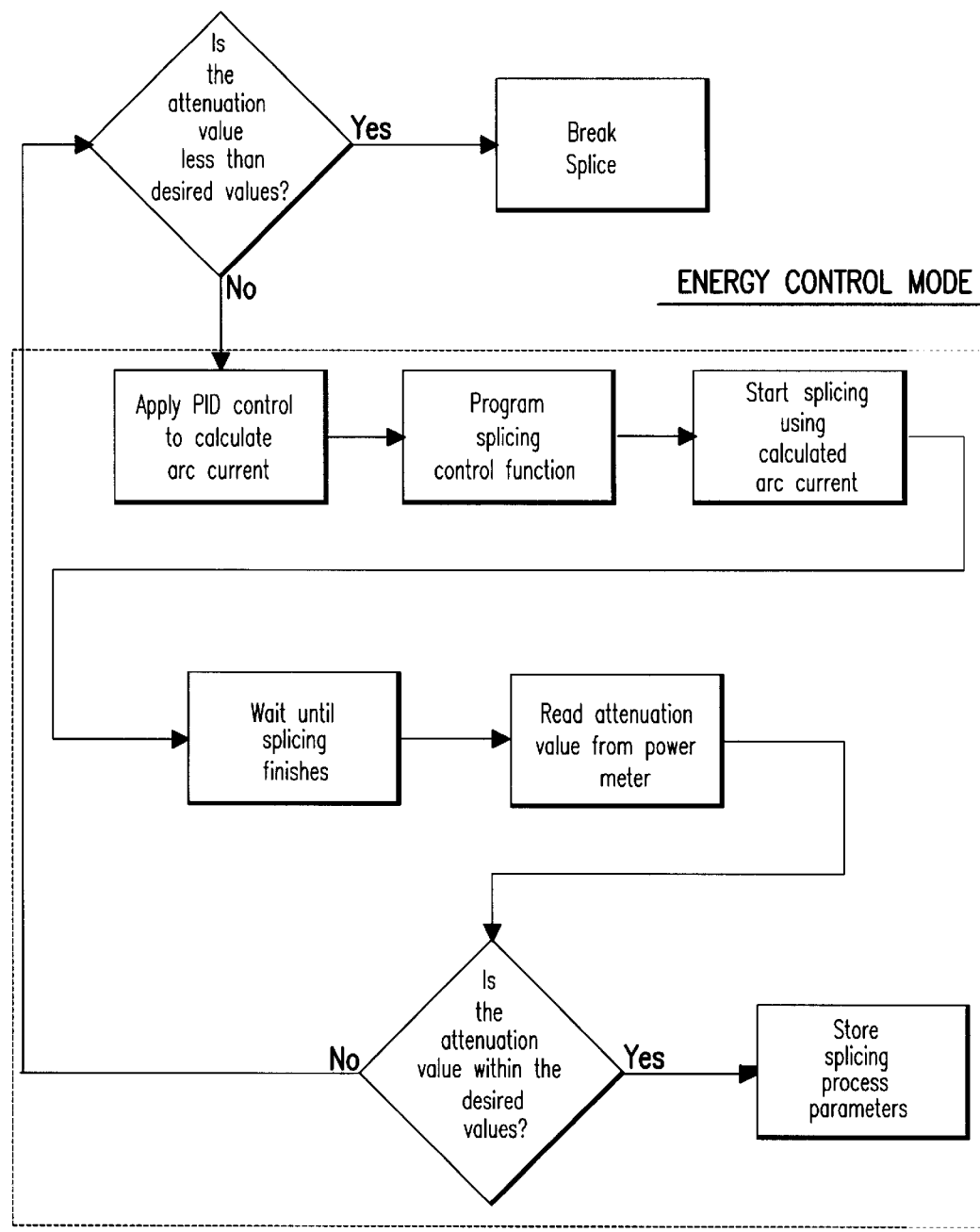
FIG. 17 is a lower level flow diagram showing details of an energy mode control method using PID control according to an alternative embodiment for performing attenuation splicing.

In another alternative embodiment, a method is provided for more accurately controlling power (e.g., arc current) in energy control mode and as shown in FIG. 15 and FIG. 17. Referring to FIG. 15 and FIG. 17, a method which employs repeated re-splicing using a Proportional-lntegral-Derivative (PID) controller 62 is described, wherein the PID controller 62 is used to predict an arc current to be applied to the fiber by the splicer 30. A PID controller 62 is a feedback controller whose output is a control variable that is generally based on the error between some user-defined set point and some measured process variable.

Each element of the PID controller 62 refers to a particular action taken on the above mentioned error. For example, the proportional action includes multiplying the error by a gain, $K_p$, which is an adjustable amplifier. Typically, this gain, $K_p$, is responsible for process stability. The integral action includes multiplying the integral of the error by a gain, $K_i$. Typically, $K_i$ is responsible for driving any error to zero. The derivative action includes multiplying the rate of change of the error by a gain, $K_d$, wherein $K_d$ is responsible for system response.

In accordance with an embodiment of the invention, and preferably while the arc current $u_k$ is not being applied to the fiber, the measured attenuation value, $L_k$, wherein k=1,2, . . . n, at kth repetition measurement is obtained from measurement by the power meter. In addition, if the target attenuation is represented by $A_d$, then the error, $e_k$, between the target attenuation, $A_d$, and the measured attenuation, $x_k$, at the kth measurement is given by:

$$e_k=A_d-L_k$$

Therefore, the discrete PID formula is given by;

$$U_k=P*e_k+I*\Sigma e_i+D*(e_k-e_{k-1})$$

where P is the proportional parameter, I is the integral parameter and D is the derivative parameter. In accordance with an embodiment of the invention, each of P, I, and D may be selected using control theory for different applications, using design of experiment techniques.

As shown in FIG. 17, PID controller 62 is used to predict an arc current to be applied by controller 10 during the energy control mode. Once the arc current is predicted, the controller 10 begins splicing using the predicted arc current. When the splicing has been completed, the attenuation value is measured by the power meter. The measurement is very accurate at this point because the final jump has occurred. This attenuation value is then examined so as to determine if the attenuation value is within the desired range of attenuation values. If the measured attenuation value is within the desired range of attenuation values, then the splicing is terminated and the splicing process parameters are stored as described hereinabove. If the measured attenuation value is not within the desired range of attenuation values, then the energy control mode is repeated until the attenuation value is within the desired range or attenuation values.

Figure 18:
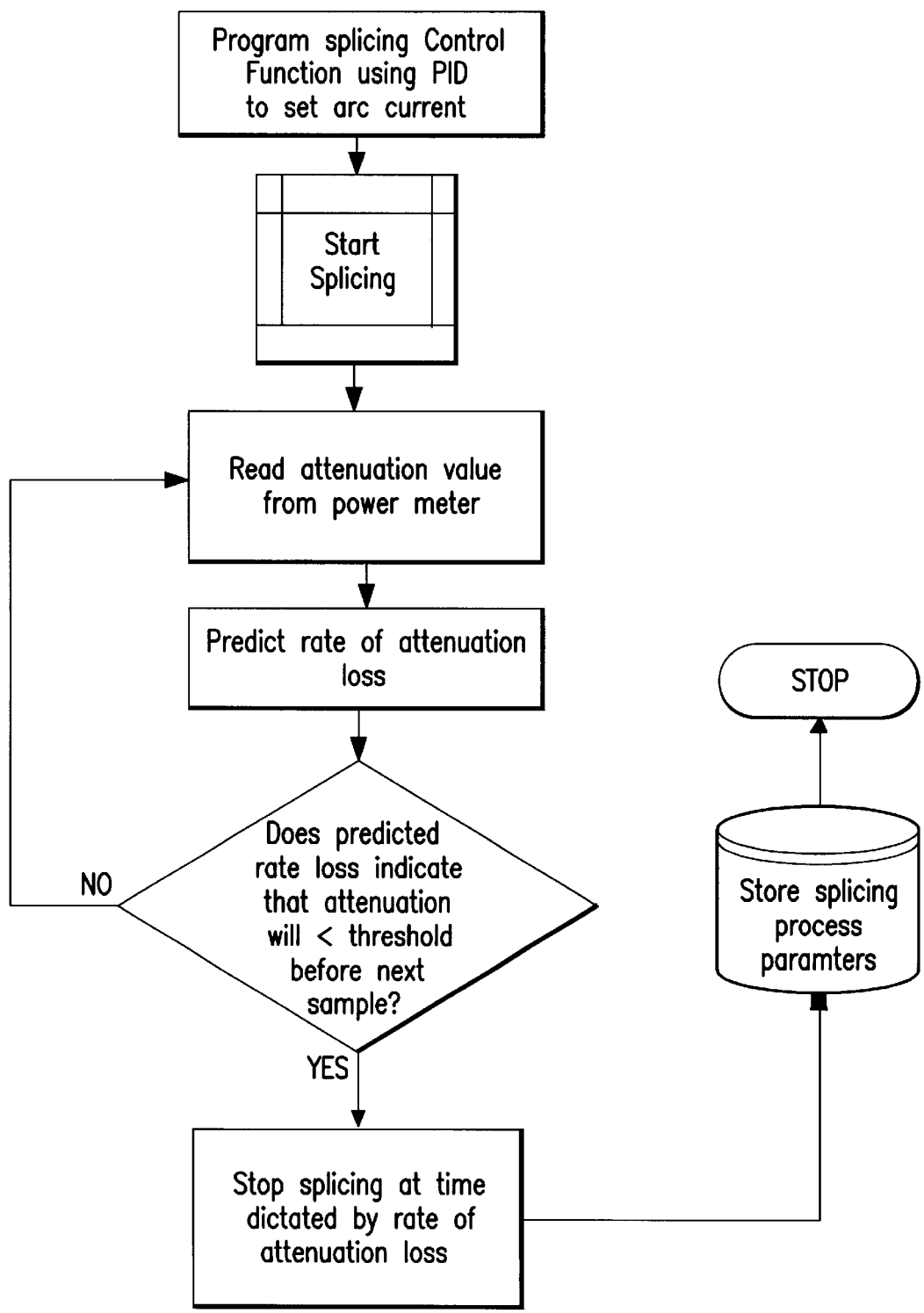
FIG. 18 is a lower level flow diagram showing details of an alternate power mode control method using PID control and an estimator according to an alternative embodiment for performing attenuation splicing.

In accordance with another embodiment of the invention, the estimator 60 and PID control 62 may be used concurrently. Referring to FIG. 18, the PID control formula is used in the initial stage to establish the appropriate arc current. In this embodiment, past measurement data is used to determine the appropriate arc current. Once the arc current is establish through PID control, the process uses the estimator to predict rate of attenuation loss and stop the splicing device as described above with reference to FIG. 16.

In accordance with an embodiment of the invention, the estimator 60 may be any device or circuit known in the art and suitable to the desired end purpose. It is considered within the scope of the invention that the estimator 60 may be external to controller 10, implemented by controller 10 or implemented in-part by controller 10.

In accordance with an embodiment of the invention, PID controller 62 may be any PID device or circuit known in the art and suitable to the desired end purpose. It is considered within the scope of the invention that PID controller 62 may be external to controller 10, implemented by controller 10 or implemented in-part by controller 10.

The exemplary embodiments described herein depict the controller separate from the splicer. It is understood that the controller may be embedded in the splicer executing the control processes described herein. In either situation, the controller is operatively connected to the splicer.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of controlling a fiber optic splicing machine to produce an attenuating splice having a target insertion loss value, comprising:

misaligning a first and a second fiber such that their respective optical axes are not aligned;

controlling an amount of power applied by the fiber optic splicing machine to fuse the first and second fibers and form the attenuating splice;

measuring an insertion loss of the attenuating splice at a sampling interval while the fusing is occurring;

predicting a rate of attenuation loss; and shutting down the power applied by the fiber optic splicing machine at a determined time when the rate of attenuation loss indicates that the insertion loss will be less than or equal to a threshold before the next sampling interval.

2. The method according to claim 1, wherein said predicting is performed by an estimator.

3. The method according to claim 2, wherein the estimator is a kalman filter.

4. The method according to claim 1, wherein the threshold is equal to the target insertion loss plus a margin.

5. The method according to claim 1, wherein the threshold is equal to the target insertion loss plus a predicted final end jump value.

6. The method according to claim 1 further comprising, using a proportional-integral-derivative control formula to determine an initial arc current applied by the fiber optic splicing machine.

7. The method according to claim 1 further comprising, controlling an amount of energy applied by the fiber optic splicing machine to adjust the insertion loss of the attenuating splice.

8. The method according to claim 7 wherein, said controlling the amount of energy controls the amount of energy by controlling a power applied by the fiber optic splicing machine and the time period in which the controlled power is applied.

9. An apparatus for controlling a fiber optic splicing machine to splice a first and a second fiber to produce an attenuating splice having a target insertion loss value, comprising:

a controller operatively connected to the fiber optic splicing machine;

a laser operatively connected to the first fiber;

a power meter operatively connected to said controller and to the second fiber;

an estimator operatively connected to said controller;

said controller controlling an amount of power applied by the fiber optic splicing apparatus to fuse the first and second fibers and form the attenuating splice;

said power meter measuring an insertion loss of the attenuating splice at a sampling interval while the fusing is occurring;

said estimator predicting a rate of attenuation loss; and said controller shutting down the power applied by the fiber optic splicing apparatus at a determined time when the rate of attenuation loss indicates that the insertion loss will be less than or equal to a threshold before the next sampling interval.

10. The apparatus according to claim 9, wherein said estimator is a kalman filter.

11. The apparatus according to claim 9, wherein the threshold is equal to the target insertion loss plus a margin.

12. The apparatus according to claim 9, wherein the threshold is equal to the target insertion loss plus a predicted final end jump value.

13. The apparatus according to claim 9 further comprising, a proportional-integral-derivative controller operatively connected to said controller, said proportional-integral-derivative controller determining an initial arc current applied by the fiber optic splicing machine.

14. The apparatus according to claim 9 wherein, said controller controls an amount of energy applied by the fiber optic splicing machine to adjust the insertion loss of the attenuating splice.

15. The apparatus according to claim 14 wherein, said controller controls the amount of energy by controlling a power applied by the fiber optic splicing machine and the time period in which the controlled power is applied.

16. A storage medium encoded with machine-readable computer program code for controlling a fiber optic splicing machine to splice a first and a second fiber to produce an attenuating splice having a target insertion loss value, the storage medium including instructions for causing a controller coupled to fiber optic splicing machine to implement a method comprising:

controlling an amount of power applied by the fiber optic splicing machine to fuse the first and second fibers and form the attenuating splice;

receiving a measure of insertion loss of the attenuating splice at a sampling interval while the fusing is occurring;

predicting a rate of attenuation loss; and shutting down the power applied by the fiber optic splicing machine at a determined time when the rate of attenuation loss indicates that the insertion loss will be less than or equal to a threshold before the next sampling interval.

17. The storage medium according to claim 16, wherein the threshold is equal to the target insertion loss plus a margin.

18. The storage medium according to claim 16, wherein the threshold is equal to the target insertion loss plus a predicted final end jump value.

19. A method of controlling a fiber optic splicing machine to produce an attenuating splice having a desired insertion loss value, comprising:

misaligning a first and a second fiber such that their respective optical axes are not aligned;

controlling an amount of energy applied by the fiber optic splicing machine to fuse the first and second fibers, measuring an insertion loss of the attenuating splice; and, repeating said controlling and said measuring until the measured insertion loss is within a desired range of insertion loss values;

wherein said controlling includes determining an error between the desired insertion loss and the measured insertion loss and calculating the amount of energy applied by the fiber optic splicing machine in response to the error, and said calculating is performed using a proportional-integral-derivative control formula.

20. The method according to claim 19, wherein, the proportional-integral-derivative control formula determines arc current applied by the fiber optic splicing machine.

21. An apparatus for controlling a fiber optic splicing machine to splice a first and a second fiber to produce an attenuating splice having a desired insertion loss value, comprising:

a controller operatively connected to the fiber optic splicing machine;

a laser operatively connected to the first fiber;

a power meter operatively connected to said controller and to the second fiber;

said controller controlling an amount of energy applied by the fiber optic splicing machine to fuse the first and second fibers, said power meter measuring an insertion loss of the attenuating splice; and, said controller repeating the controlling and measuring until the measured insertion loss is within a desired range of insertion loss values;

wherein said controller determines an error between the desired insertion loss and the measured insertion loss and calculates the amount of energy applied by the fiber optic splicing machine in response to the error, and said controller calculates the amount of energy applied by the fiber optic splicing machine using a proportional-integral-derivative control formula.

22. The apparatus according to claim 21, wherein, the proportional-integral-derivative control formula determines are current applied by the fiber optic splicing machine.

23. A storage medium encoded with machine-readable computer program code for controlling a fiber optic splicing machine to splice a first and a second fiber to produce an attenuating splice having a desired insertion loss value, the storage medium including instructions for causing a controller coupled to fiber optic splicing machine to implement a method comprising:

controlling an amount of energy applied by the fiber optic slicing machine to fuse the first and second fibers, receiving a measure of an insertion loss of the attenuating splice; and, repeating said controlling and said receiving until the measured insertion loss is within a desired range of insertion loss values;

wherein said controlling includes determining an error between the desired insertion loss and the measured insertion loss and calculating the amount of energy applied by the fiber optic splicing machine in response to the error, and said controller calculates the amount of energy applied by the fiber optic splicing machine using a proportional-integral-derivative control formula.

24. The storage medium according to claim 23, wherein, the proportional-integral-derivative control formula determines arc current applied by the fiber optic splicing machine.

* * * * *